United States Patent
Hejlsberg

(10) Patent No.: US 6,185,728 B1
(45) Date of Patent: Feb. 6, 2001

(54) DEVELOPMENT SYSTEM WITH METHODS FOR TYPE-SAFE DELEGATION OF OBJECT EVENTS TO EVENT HANDLERS OF OTHER OBJECTS

(75) Inventor: Anders Hejlsberg, Los Altos Hills, CA (US)

(73) Assignee: Inprise Corporation, Scotts Valley, CA (US)

(*) Notice: Under 35 U.S.C. 154(b), the term of this patent shall be extended for 0 days.

(21) Appl. No.: 08/594,928

(22) Filed: Jan. 31, 1996

(51) Int. Cl.[7] ....................................................... G06F 9/45
(52) U.S. Cl. ................................................................. 717/1
(58) Field of Search ................................... 395/680, 707, 395/681; 709/310, 315; 717/3, 2, 4, 1

(56) References Cited

U.S. PATENT DOCUMENTS

| | | | |
|---|---|---|---|
| 5,485,617 | * 1/1996 | Stutz et al. | 395/683 |
| 5,487,141 | 1/1996 | Cain et al. . | |
| 5,511,197 | * 4/1996 | Hill et al. | 395/683 |
| 5,537,630 | * 7/1996 | Berry et al. | 395/155 |

OTHER PUBLICATIONS

Bjarne Stroutstrup, Margaret Ellis, The Annotated C + + Reference Manual, Addison–Wesley Publishing Company p. 176–179, 228–231, 354–359, Jun. 1990.*

S.B. Lippman, B. Stroupstrup, Pointers to Class Members in C + + , 1988 USENIX C+ + Conference, p. 305–323, Dec. 1988.*

Randall Myers, The Interactions of Pointers to Members and Virtual Base Classes in C + + , p. 1–11, Feb. 1991.*

* cited by examiner

Primary Examiner—Alvin E. Oberley
Assistant Examiner—Peter S Stecher
(74) Attorney, Agent, or Firm—John A. Smart

(57) ABSTRACT

A visual development system is described which provide "method pointers" allowing a developer/user to achieve delegation between objects programmatically as well as visually. Delegation "binds" an event source with an event handler. This binding is directly supported within the programming language of the system. Using a simple assignment statement, the user can assign a handler of one object (i.e., delegated-to object) to the method pointer of another object (i.e., delegated-from object). A delegation through assignment leads to not only the address of the method being copied but also the address of the delegated-to object (i.e., "this" pointer) being copied into the method pointer. The method pointer, when called, can invoke the pointed-to method on that (delegated-to) object, complete with the context (e.g., local data) of the object. The object knows about itself and, thus, can provide the appropriate context. In this fashion, the system allows the user to easily control object behavior through delegation, whether the user is working in a visual environment or a programming environment (or switching back and forth between each).

35 Claims, 18 Drawing Sheets

DEVELOPMENT SYSTEM WITH METHODS FOR TYPE-SAFE DELEGATION OF OBJECT EVENTS TO EVENT HANDLERS OF OTHER OBJECTS

BACKGROUND OF THE INVENTION

The present invention relates generally to system and methods for creating software programs. More particularly, the present invention relates to a visual development system and methods for type-safe binding of object events with event handlers of other objects for software programs operative on digital computers.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program written in the high-level language is called the "source code" or source program. The ultimate output of the compiler is an intermediate module or "object module," which includes instructions for execution by a target processor. In the context of Borland's Turbo Pascal and Object Pascal, the intermediate module is a Pascal "unit" (e.g., .TPU file). Although an object module includes code for instructing the operation of a computer, the object module itself is not usually in a form which may be directly executed by a computer. Instead, it must undergo a "linking" operation before the final executable program is created.

Linking may be thought of as the general process of combining or linking together one or more compiled object modules or units to create an executable program. This task usually falls to a program called a "linker." In typical operation, a linker receives, either from the user or from an integrated compiler, a list of modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (typically an .EXE file) which, after testing and quality assurance, is passed to the user with appropriate installation and usage instructions.

Recently, "visual" development environments, such as Borland's Delphi™, Microsoft® Visual Basic, and Powersoft's PowerBuilder™, are rapidly becoming preferred development tools for quickly creating production applications. Such environments are characterized by an integrated development environment (IDE) providing a form painter, a property getter/setter manager ("inspector"), a project manager, a tool palette (with objects which the user can drag and drop on forms), an editor, a compiler, and a linker. In general operation, the user "paints" objects on one or more forms, using the form painter. Attributes and properties of the objects on the forms can be modified using the property manager or inspector. In conjunction with this operation, the user attaches or associates program code with particular objects on screen (e.g., button object); the editor is used to edit program code which has been attached to particular objects.

At various points during this development process, the user "compiles" the project into a program which is executable on a target platform. For Microsoft Visual Basic and Powersoft PowerBuilder, programs are "pseudo-compiled" into p-code ("pseudo" codes) modules. Each p-code module comprises byte codes which, for execution of the program, are interpreted at runtime by a runtime interpreter. Runtime interpreters themselves are usually large programs (e.g., VBRUNxx.DLL for Visual Basic) which must be distributed with the programs in order for them to run. In the instance of Delphi, on the other hand, programs are compiled and linked into true machine code, thus yielding standalone executable programs; no runtime interpreter is needed.

In the task of visually creating computer programs, a problem exists with associating code or "action" with events that occur in the system. This corresponds, for example, to the action of clicking a screen button (e.g., in Microsoft Visual Basic) and having certain program code execute as a result of that action. Although there exists a number of ways of achieving such an association, prior art approaches to creating such an association have marked limitations.

One approach to addressing the problem has been to use "subclassing." In existing class libraries (e.g., Microsoft Foundation Classes or Borland ObjectWindows Library), if one wanted to change the behavior that happens when a button is clicked in a program, one would create a "subclass" of that button and modify its respective "click" method (e.g., C++ virtual method) to implement the new behavior (i.e., user code). This approach is problematic in itself, however. Most notably, the approach leads to an unwanted proliferation of components in the system. For instance, it would be a ridiculous approach to have a separate button for each and every type of action one could possibly think of for a button. The subclassing approach of modifying behavior leaves a lot to be desired.

Another approach is to provide some form of delegation. "Delegation" is the ability to "delegate" control to somewhere. In other words, an event occurs at one object which in turn "delegates" responsibility for acting on that event to somewhere else. When modification of object behavior is required, therefore, control can be delegated elsewhere. In Microsoft Visual Basic, a limited form of "delegation" is available in the sense that a new button is not created in order to modify the behavior of a button. In Visual Basic, for instance, one can associate code with an event in the visual environment. The user cannot programmatically (i.e., through code), however, change what code gets executed upon occurrence of a particular event, such as the clicking of a particular button. Instead, Visual Basic provides an internal dispatcher so that an association created in the visual environment between an event and program code (which is to execute in response to that event) is carried out at runtime execution of the program. Specifically, the runtime interpreter of Visual Basic "behind the scenes" transfers control to the entry point of the relevant event handler, upon occurrence of the event. This type of "delegation" is pre-wired by the design environment and is not reflected in the language, as a language construct. The problem with this approach, of course, is that the user programmer cannot "get at" the internal code which is hard wired into the Visual Basic interpreter. One cannot modify programmatically where control gets delegated to (i.e., what event handler is invoked when the button is clicked). Since users of such products are unable to programmatically control aspects of the program which correspond to actions undertaken in the visual environment, runtime modification of where control gets delegated to is not possible.

The disadvantages of the prior art approaches can be summarized as follows. The subclassing approach to modifying behavior (i.e., the non-delegation model) entails the substantial disadvantage of class proliferation—an approach which itself leads to problems of bookkeeping (instead of solving the task at hand). The disadvantage with Visual Basic (and other environments which adopt that approach) is that delegation is not a natural extension of whatever language is provided in the environment. Therefore, the actual delegation is hidden from the programmer in a manner which hinders the programmer's ability to switch back and forth between source code and visual environment view of the program under development.

What is needed, therefore, is a development system with methods which allow anything that can be done visually (e.g., clicking a button and having code execute) to also be done programmatically (i.e., through the programming language). Specifically, delegation is provided as a fundamental feature of the programming language for the environment. Such a system would allow the programmer to treat program code attached to an object as a property of that object. In this fashion, such an environment can provide visual "two-way" tools which are built on top of a programmatic mapping—that is, the tools reflect what the user himself or herself could do in the code.

SUMMARY OF THE INVENTION

The present invention comprises a visual development system which allows a developer/user to easily control object behavior, whether the user is working in a visual environment or a programming environment, or switching back and forth between the two. More particularly, the present invention introduces "method pointers," which allow a developer or programmer to achieve delegation between objects programmatically as well as visually.

When the users makes a connection in the visual design environment between two objects (i.e., between a source and a sink), that connection can be treated as an assignment of a method pointer, or an action (e.g., property setting) that could be directly mapped into an assignment of a method pointer. Specifically, delegation is achieved in the source code by assigning a method pointer for a particular event of an object to point to a particular handler; or the assignment is done visually in a manner similar to that of setting an object's properties. Therefore, application of method pointers of the present invention can be integrated with the visual design environment to provide easy, type-safe binding or connection between objects.

Delegation "binds" an event source with an event handler. In the system of the present invention, this binding is provided in the language by a simple assignment: a method from a handler is assigned to the method pointer of the object which is delegating. The source, having received the event, holds the information of the event and knows to delegate it to the other object. The receiving object, once control arrives there through delegation, is utterly unconcerned about where control came from, as such. In this manner, a handler can be crafted to receive events as a result of a button click, a scroll bar event, a form being shown or hidden, or the like, so long as the source that invokes the handler passes along the appropriate type of information (i.e., is "type safe").

In the visual development environment of the present invention, the programmer action of changing the value of an object in the property manager or "inspector" is equivalent to an assignment in the programming language. No difference exists. The object which is being manipulated is completely unaware that the property change occurred as a result of an assignment somewhere or a change entered by the programmer using the property manager or inspector.

Actual delegation through the method pointer occurs at runtime when the method pointer is "called" (i.e., call the function which the function pointer portion of the method pointer points to). During this delegation, the method pointer of the present invention passes along additional information: context. Specifically, the method pointer also contains a pointer to an instance of an object which is responsible for the delegation. Specifically, the "this" (or "self") pointer of the delegated-to object is also passed along, thereby providing a context. In the system of the present invention, therefore, a delegation through assignment leads to not only the address of the method being copied but also the "this" pointer being copied into the method pointer. Now, the method pointer has the ability, when called, to invoke the pointed-to method on that (delegated-to) object, complete with the context (e.g., local data) of the delegated-to object. The object knows about itself and, thus, can provide the appropriate context.

Also described is an approach of the present invention for generating exceptionally efficient machine code instructions for calls through method pointers. A call through a method pointer comprises fetching the "this" pointer (stored at a second DWORD of the method pointer) and calling through the pointer-to-method (i.e., function pointer stored by the first DWORD of the method pointer).

DETAILED DESCRIPTION OF A PREFERRED EMBODIMENT

The following description will focus on a preferred embodiment of the present invention (and certain alternatives) embodied in a visual development environment running on an Intel 80x86-compatible computer operating under an event-driven operating system, such as the Microsoft® Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

General Architecture

A. System Hardware

Figure 1A:
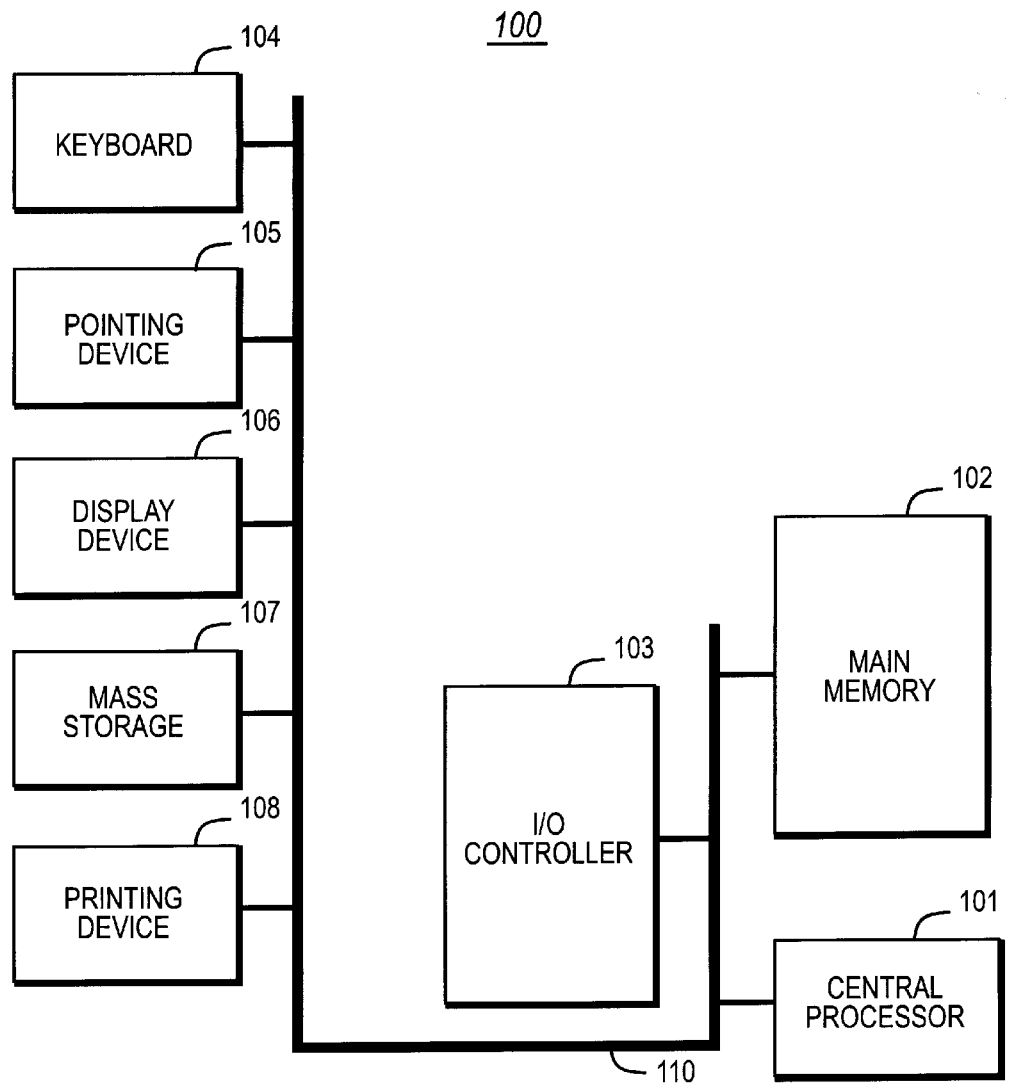
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., removable disk, floppy disk, fixed disk, optical disk (including CD-ROM), and the like). Additional input/output devices, such as a printing device 108, may be provided with the system 100 as desired. As shown, the various components of the system 100 communicate through a system bus 110 or similar architecture. In a preferred embodiment, the system 100 includes an IBM-compatible personal computer, available from a variety of vendors (including IBM of Armonk, N.Y.).

B. System Software

Figure 1B:
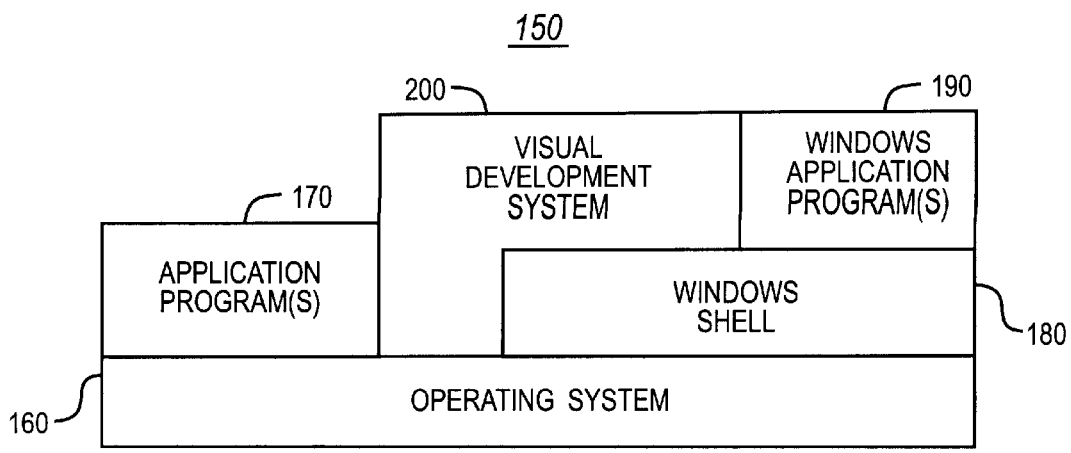
FIG. 1B is a block diagram of a software system for controlling the operation of the system of FIG. 1A.

Illustrated in FIG. 1B, a computer software system 150 is provided for directing the operation of the computer system 100. Software system 150, which is stored in system memory 102 and/or on disk storage 107, includes a kernel or operating system (OS) 160 and a windows shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190, include an interface for receiving user commands and data and displaying results and other useful information. Software system 150 also includes a visual development system 200 of the present invention for developing system and application programs. As shown, the development system 200 includes components which interface with the system 100 through windows shell 180, as well as components which interface directly through OS 160.

In a preferred embodiment, operating system 160 includes MS-DOS and shell 180 includes Microsoft® Windows, both of which are available from Microsoft Corporation of Redmond, Wash. Alternatively, components 160 and 180 can be provided by Microsoft Windows 95. Those skilled in the art will appreciate that the system may be implemented in other platforms, including Macintosh, UNIX, and the like. Development system 200, on the other hand, includes Delphi™, available from Borland International of Scotts Valley, Calif. (Part No. HDB1110WW41180). Application software 170, 190 can be any one of a variety of application software, such as word processing, database, spreadsheet, text editors, and the like, including those created by the development system 200.

C. Development System

Figure 2:
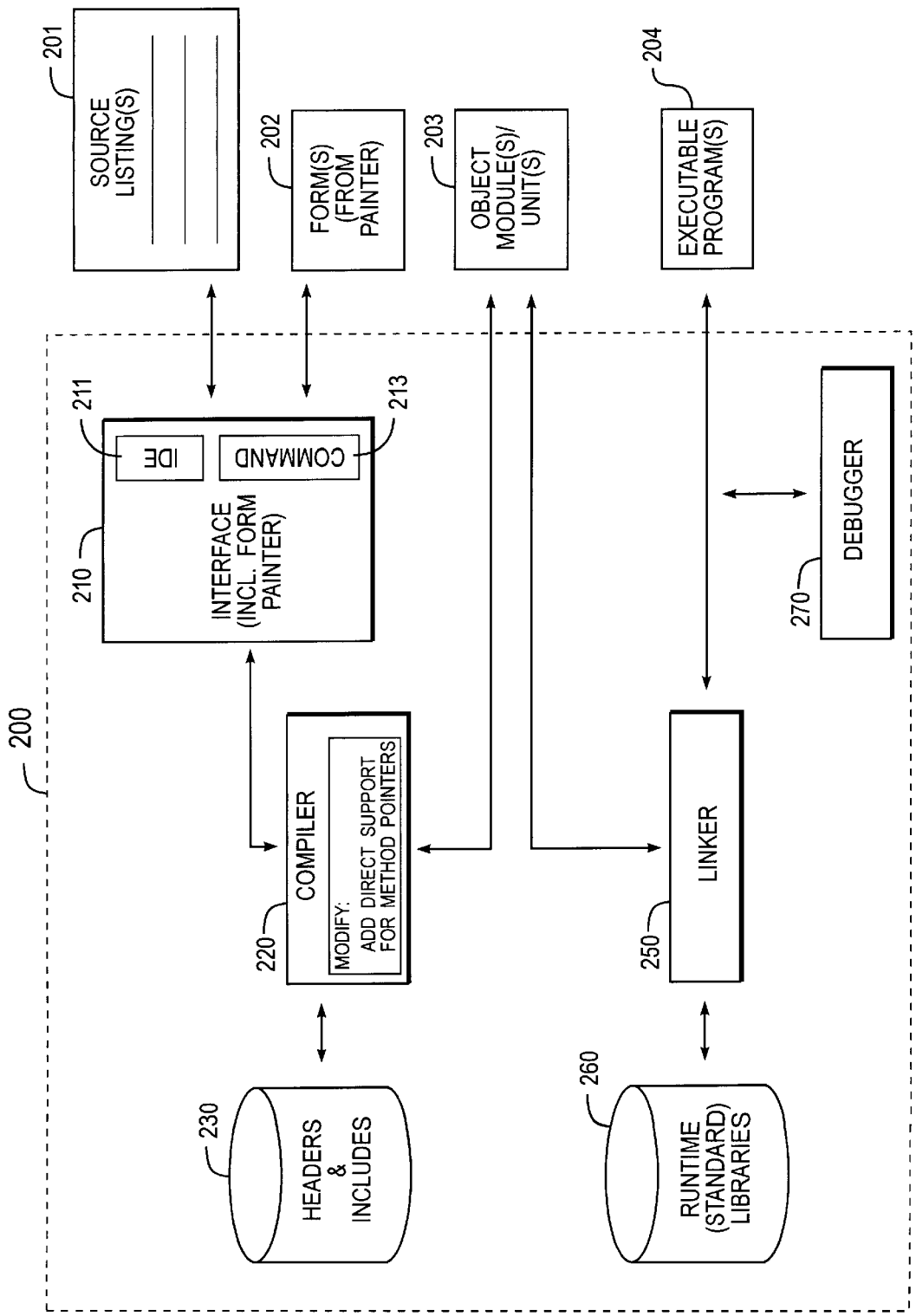
FIG. 2 is a block diagram of a visual development system of the present invention.

Shown in further detail in FIG. 2, the visual development system 200 of the present invention includes a compiler 220, a linker 250, and an interface 210. Through the interface, the developer user "paints" forms 202 with objects and supplies source listings 201 to the compiler 220. Interface 210 includes both command-line driven 213 and Integrated Development Environment (IDE) 211 interfaces, the former accepting user commands through command-line parameters, the latter providing menuing equivalents thereof. From the source code or listings 201, forms 202, and headers/includes files 230, the compiler 220 "compiles" or generates object module(s) or "units" 203. In turn, linker 250 "links" or combines the units 203 with runtime libraries 260 (e.g., standard runtime library functions) to generate program(s) 204, which may be executed by a target processor (e.g., processor 101 of FIG. 1A). The runtime libraries 260 include previously-compiled standard routines, such as graphics, I/O routines, startup code, math libraries and the like.

A description of the general operation of development system 200 is provided in the manuals accompanying Delphi™: *Users Guide* (Part No. HDB1110WW21770), and *Components Writer's Guide* (Part No. HDB1110WW21772). Further description can be found in *Object Pascal Language Guide* (Part No. HDB1110WW21774) and *Visual Component Library Reference* (Part No. HDB1110WW21775). The disclosures of each of the foregoing (which are available directly from Borland International of Scotts Valley, Calif.) are hereby incorporated by reference.

General operation (i.e., "compilation") by a compiler, such as compiler 220, comprises two main components: a front end and a back end. The "front end" of the compiler parses the source program and builds a parse tree—a well known tree data structure representing parsed source code. The "back end" traverses the tree and generates code (if necessary) for each node of the tree, in a post-order fashion. For an introduction to the general construction and operation of compilers, see Fischer et al., *Crafting a Compiler with C*, Benjamin/Cummings Publishing Company, Inc., 1991, the disclosure of which is hereby incorporated by reference. Further description of the back end of the compiler is provided in commonly-owned U.S. Pat. No. 5,481,708, issued Jan. 2, 1996. Further description of the linker is provided in commonly-owned U.S. Pat. No. 5,408,665, issued Apr. 18, 1995. The disclosures of each of the foregoing patents are hereby incorporated by reference.

The following description will focus on those features of the development system 200 which are helpful for understanding methods of the present invention for type-safe delegation of object events to event handlers of other objects in a visual development environment.

Delegation

A. Introduction

The present invention allows a programmer to specify in the source code (i.e., with full language support), as well as visually, where control is passed to at runtime. Recall that "delegation" is the ability to "delegate" control to somewhere. Wherever control is delegated, the recipient should generally be unaware that control arrived at it because of a particular event, such as a button click. In other words, the recipient should not be dependent upon a particular context, for control to arrive at it. For example, two or three buttons of different types might all want to delegate control to the same handler. The handler should be prepared to receive control from any one of these buttons, or any other button type.

On the other hand, delegation should occur in a type-safe manner: the recipient should expect to receive the same amount of information as the provider gives. A simple button might, for instance, have information about a click event. A button handler should, therefore, expect to receive information about a click event from some type of button. A list box, on the other hand, might require additional information, such as the x/y coordinates indicating where an end user clicked in the list box. Passing such information to the just-described simple button handler would not be meaningful. In order to prevent delegation between "wrong" types of objects, therefore, the system of the present invention requires a sender object (delegating object) to be compatible with a receiver (handler). Here, the handler should expect to receive the same amount of information as the sender is providing, so that the handler receives information which it can act on in a meaningful manner.

B. Visual "two-way" tools

Since delegation is supported in a generic manner, both at design time and at runtime, the present invention simplifies the task of creating visual "two-way" (bi-directional) tools. These are tools which allow the programmer to easily switch between a source code view and a visual view of one's program in the design environment. With this approach, the present invention solves the problem in the programming language and then builds a visual environment which allows the programmer to do whatever can be done in the programming language.

In the Visual Basic approach, in contrast, some things can be done in the programming language and some things can be done in the visual environment, but the two are not fully compatible in terms of that which can be achieved by each. With Visual Basic, therefore, the tasks which can be completed by each do not completely overlap, thus preventing the programmer from easily switching between the source code view and the visual environment view of the program under development. In Visual Basic, a binary form (.frm) file is provided which comprises binary resources (e.g., icons, bitmaps, and the like) together with a binary version (p-code) of the user's program. The latter is, in a visually-generated binary file, program code which the programmer cannot get at. With that approach, some of the behavior of the user's program is visually-generated, yet not accessible in source code format. For the Visual Basic programmer, this leads to the particular problem of having actions occur in his or her program which the programmer has no control over; he or she simply cannot "get to" the behavior from the source code.

With the present invention, in contrast, everything which happens in the program can be expressed programmatically, so that the programmer can discern from the source code of the program everything which happens in the program—nothing is hidden "behind the scenes." Instead of hard-wiring delegation in a binary form file, the system of the present invention provides delegation in source code format, so that the user can access all aspects of his or her program, regardless of whether portions of the program are visually generated or hand coded.

Improved Visual Development Environment: "Method Pointers"

A. Method pointers

The present invention introduces "method pointers" for achieving delegation programmatically as well as visually. When a connection is made in the visual design environment between two objects (i.e., between a source and a sink), that connection can be treated as an assignment of a method pointer, or an action (e.g., property setting) that could be directly mapped into an assignment of a method pointer. Specifically, delegation is achieved in the source code by assigning a method pointer for a particular event of an object to point to a particular handler, or the assignment is done visually in a manner similar to that of setting an object's properties. Therefore, application of method pointers of the present invention can be integrated with the visual design environment to provide easy, type-safe binding or connection between objects.

By default, the method pointers for event handlers of objects point to nowhere (i.e., initially each is set equal to "nil"). Consider a button object on a form, for instance. When a button is clicked at runtime, much activity occurs, such as the visual feedback which is provided to the end user. Generally, this default behavior is not of concern to the programmer. Instead, the programmer is concerned with the particular action of the program which is to be carried out upon the user's invocation of the button: the programmer-specified action that is associated the button and which is executed by the system at the correct point of having given visual button feedback. The default "nothing" behavior associated with a button (i.e., method pointer equal "nil") is changed by the programmer assigning some method (i.e., handler) of another object into the method pointer of the button object. As a result, control for the button will be delegated to the other object—the other object's handler code will execute. When control returns from the handler, the program continues normal execution.

Delegation "binds" an event source with an event handler. In the system of the present invention, this binding is provided in the language by a simple assignment: a method from a handler is assigned to the method pointer of the object which is delegating. The source, having received the event, holds the information of the event and knows to delegate it to the other object. The receiving object, once control arrives there through delegation, is utterly unaware of where control came from, as such. In this manner, a handler can be crafted to receive events as a result of a button click, a scroll bar event, a form being shown or hidden, or the like, so long as the source that invokes the handler passes along the appropriate type of information (i.e., is "type safe").

In the visual development environment of the present invention, the programmer action of changing the value of an object in the property manager or "inspector" is equivalent to an assignment in the programming language. No difference exists. The object which is being manipulated is completely unaware that the property change occurred as a result of an assignment somewhere or a change entered by the programmer using the property manager or inspector.

The assignment itself performs the binding between two objects, but does not perform the actual delegation. Understanding of how actual delegation occurs is perhaps best understood by examining conventional "function pointers." Consider, for example, a function pointer in the C programming language. With a C function pointer, one can assign the address of any function to a function pointer having a compatible type—that is, a function which takes the same type and number of parameters. The assignment, in and of itself, does nothing other than transfer the address in the function pointer variable. Actual delegation through the function pointer occurs at runtime when the function pointer is "called" (i.e., call the function which the function pointer points to). If the function pointer is not nil (i.e., it points to something), the system invokes through it and passes along the appropriate parameters. The foregoing essentially provides a limited form of "closure"—a binding of an event source with an event handler.

A "method pointer" implemented in the system of the present invention passes along additional information: context. The mere invocation of a method through a function pointer does not provide a context, that is, associated data describing the context of invocation (including the particular "sender" object). This information may in fact be required by the function being invoked, for proper operation. With a conventional function pointer, delegation can only delegate control to some global function in the system. Unless some context information is passed along, such as through a parameter, the function being invoked through the function pointer must execute without context.

The method pointer of the present invention, in contrast, provides context. Specifically, a method pointer is indeed a pointer to a function or method. Further, it also contains a pointer to an instance of an object which is responsible for the delegation. Specifically, the "this" (or "self") pointer of the delegated-to object (i.e., the handler's object) is also passed along, thereby providing a context for executing the handler method. In the system of the present invention, therefore, a delegation through assignment leads to not only the address of the method being copied but also the "this" pointer being copied into the method pointer. Now, the method pointer has the ability, when called, to invoke the pointed-to method on that (delegated-to) object, complete with the context (e.g., local data) of the delegated-to object. The object knows about itself and, thus, can provide the appropriate context—that is, access to its local data members.

Note particularly that this approach does not depend on what "type" an object is. To understand the importance of this, consider an implementation which relies on a function pointer. To do this delegation with a function pointer, passing the "this" pointer as a parameter, one would have a problem with what type the parameter would be declared. One would have to rely on declaring it to be a generic type of object from which all objects are inherited. To attempt to implement this with C++ function pointers, for instance, one would be required to write a generic wrapper function that takes a generic "this" pointer and then, in that wrapper function, cast the generic "this" pointer to the correct object type (i.e., the object type which is known) and then invoke the real method. The wrapper function is required for downcasting the "this" pointer (for restoring context). The down casting leads to loss of type safety and, thus, is unacceptable. All told, the approach of the present invention cannot be implemented using existing language systems without defeating the type safety checking provided by those systems.

In the system of the present invention, it is uninteresting to the delegating object (i.e., object seeking to delegate to another) what exact object it actually ends up delegating to. That piece of the context information is not interesting. Any other parameters supplied, on the other hand, are indeed interesting and are subjected to type checking. When an assignment is made from a method of an object into a method pointer, the system of the present invention copies the "this" pointer of the delegating object without concern for what particular objects are being bound together. When an object invokes through a method pointer, it appears as if it is a regular function call; the invocation need only supply the additional information (parameters). The programmer is unaware of the "this" pointer. Nevertheless, the system guarantees that it is safe to call through the method pointer, because it is known that it is a method of the object (i.e., there is no type issue).

Moreover, the approach of the present invention leads to very efficient invocation calls. Calling through a normal function pointer is an indirect call. Calling through a method pointer of the present invention simply requires loading (into a register) the "this" pointer and then calling through the address stored by the method pointer (i.e., the function pointer portion of the method pointer).

Further, the approach can be employed to optimize calls to virtual methods. Consider, for instance, an assignment to a method pointer of a virtual method of an instance (Instance.Method). In the system of the present invention, the virtual method can be resolved at the time of the assignment (i.e., the assignment at runtime). Since the actual address of the virtual method can be resolved, the need to employ a virtual table (the table) of function pointers for dispatching the call is eliminated, thereby leading to one less level of indirection. More particularly, at this point, the system knows the object instance and the virtual method, so it knows exactly where control should arrive (i.e., the particular function address) every time this virtual method is called.

B. Method pointer examples

The design stipulation for the system of the present invention is that anything done visually simply maps into something which can be done in source code format. For purposes of understanding the present invention, therefore, one can focus on what is done in code.

Figure 3A:
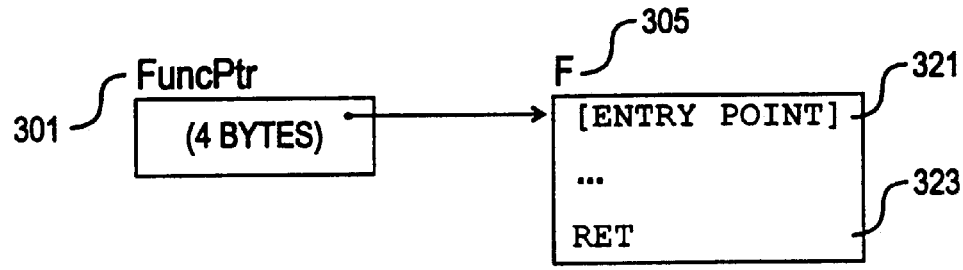
FIGS. 3A–B illustrate a "method pointer" of the present invention, as compared against a classical function pointer.
Figure 3B:
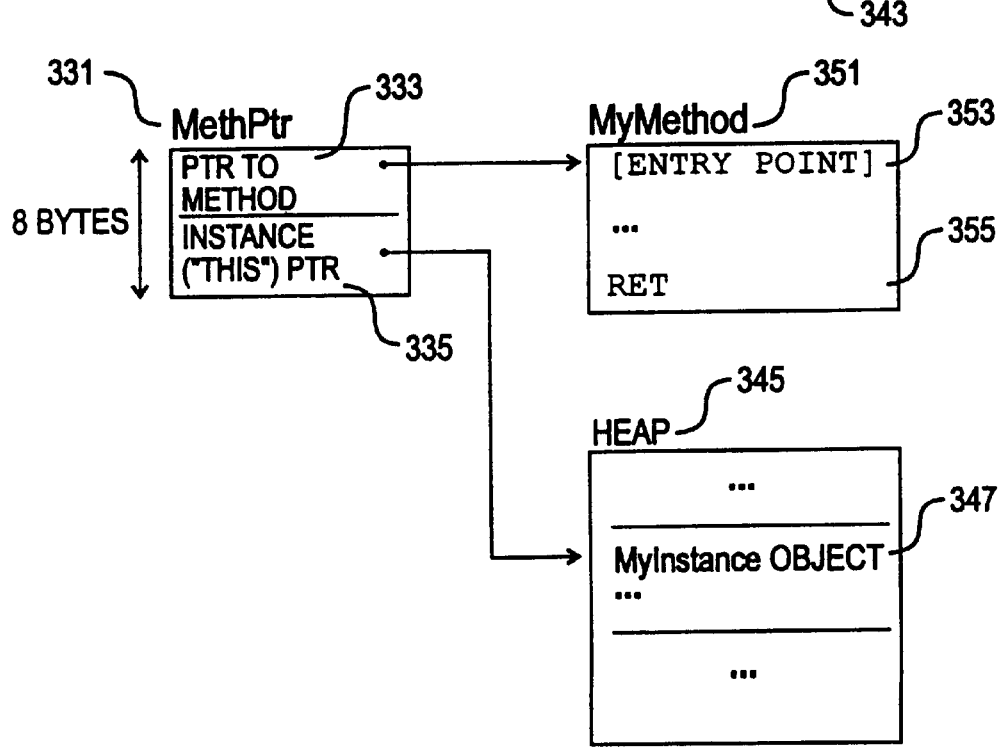

The "method pointers" of the present invention are perhaps best illustrated diagrammatically. FIGS. 3A–B illustrate the difference between a classic function pointer, on the one hand, and a method pointer of the present invention, on the other. FIG. 3A illustrates a function pointer, FuncPtr 301, which is four bytes in size (or whatever the address size of the underlying computer is). A function, F, can be assigned to FuncPtr, as shown at 311 (in Object Pascal syntax):

FuncPtr:=F;

A call through the function pointer is shown at 315.

FuncPtr(X, Y);

FuncPtr, after the assignment at 311, points to the entry point of the function F. Function F comprises an entry point, at 321, followed by a return instruction, at 323. In this manner, the function call at 315 indirectly calls the function F, by calling through the function pointer, FuncPtr. Note, however, that function F has no context information about the object which it is invoked on.

As shown in FIG. 3B, a method pointer 331, MethPtr, stores a pointer to (i.e., address of) method 333, together with a pointer to (address of) the particular object instance (i.e., "this" pointer) 335. In an exemplary embodiment (e.g., Intel 80x86 platform), the method pointer (MethodPtr) has a total size of eight bytes; the conventional function pointer has a size of four bytes. The particular method (handler)—MyMethod 351—and instance—MyInstance 347 (stored on heap 345)—are both stored by the method pointer 331. Method MyMethod, like function F, comprises an entry point (at 321), followed by a return instruction (at 355). Unlike function F, however, MyMethod has, through "this" pointer 335, complete access to the context of the object which it is invoked on. Further, since the address of the method can be resolved at the time of assignment (at 341), the call (at 343) can be executed very efficiently by simply loading the instance ("this") pointer in a register (or push it on to the stack) and then calling the address stored by the pointer to method.

Also shown in FIG. 3B, the assignment syntax of method pointers takes the form of the method pointer being set equal to Instance.Method. The call syntax for the method pointer, shown at 343, takes the same form as that employed for a function pointer: one simply "calls through" the method pointer, passing the relevant parameters. In an application, for instance, a typical assignment might look like:

MyButton.OnClick:=MyForm.Button1Click.

Note particularly that the programmer need not be concerned about the "this" pointer, when making the call.

Since the assignment to the method of a particular instance follows the syntax of Instance.Method, the syntax automatically avails itself of other language features. In an Object Pascal embodiment, for instance, the assignment can be used in conjunction with the Pascal with reserved word:

```
with MyButton do
    color := Red;
    OnClick := MyForm.Button1Click;
    { etc. }
end;
```

In a similar fashion, the syntax is simplified when the assignment occurs within the scope of the referenced object—that is, to a handler which is within scope. The syntax simplifies to just using the name of the handler itself; the instance name is implied.

C. Preferred interface

Figure 3C:
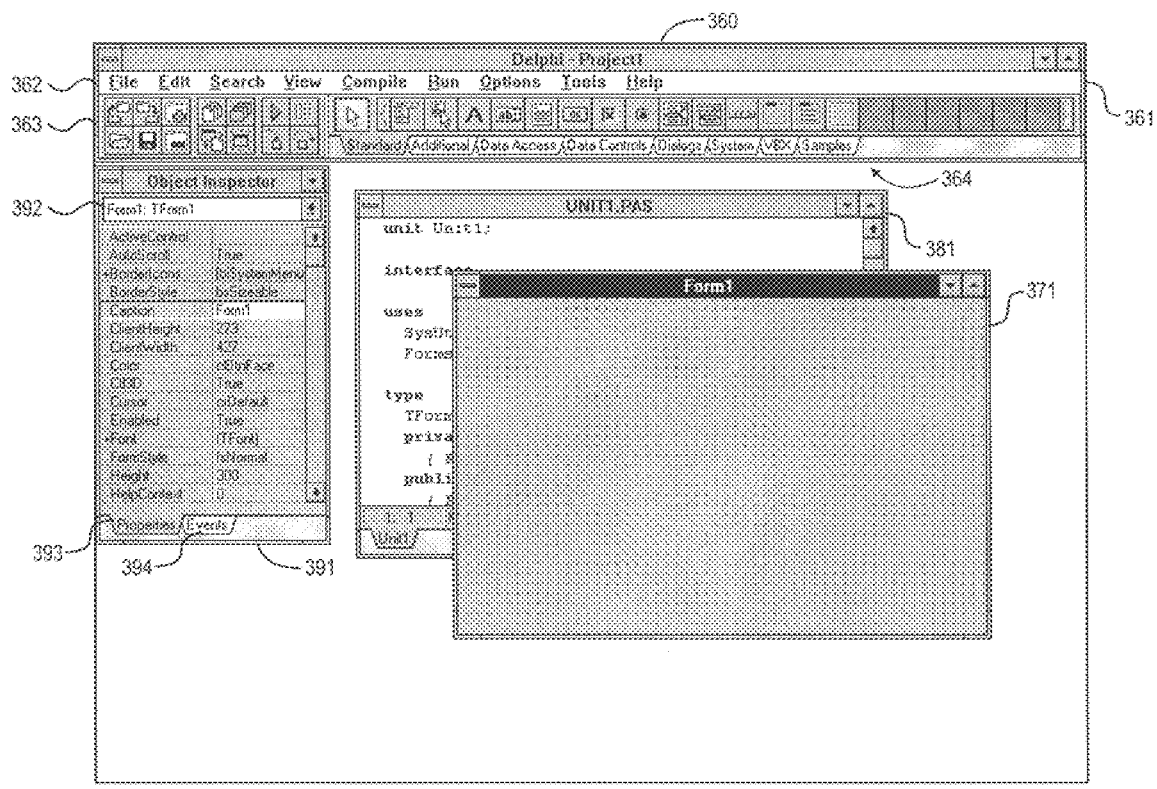
FIG. 3C is a bitmap screenshot illustrating a preferred interface of the visual development system of the present invention.

The present invention is embodied in Delphi™, a component-based, rapid application development (RAD) environment available from Borland International of Scotts Valley, Calif. FIG. 3C illustrates an application development environment 360, which is provided by Delphi. Many of the traditional requirements of programming, particularly for Windows applications, are handled for the programmer automatically by Delphi.

As shown, the programming environment 360 comprises a main window 361, a form 371, a code editor window 381, and an object manager or "inspector" window 391. The main window 361 itself comprises main menu 362, tool bar buttons 363, and component palette 364. Main menu 362 lists user-selectable commands, in a conventional manner. For instance, the main menu invokes File, Edit, View submenus, and the like. Each submenu lists particular choices which the user can select. Working in conjunction with the main menu, toolbar 363 provides the user with shortcuts to the most common commands from the main menu. The toolbar is configurable by the user for including icons for most of the menu commands.

Forms, such as form 371, are the focal point of nearly every application which one develops in the environment. In typical operation, the user employs the form like a canvas, placing and arranging "components" on it to design the parts of one's user interface. The components themselves are the basic building blocks of applications developed within the environment. Available components appear on the component palette 364, which is displayed as part of the main window 361. The form can be thought of as a component that contains other components. One form serves as the main form for the application; its components interact with other forms and their components to create the interface for an application under development. In this manner, the main form serves as the main interface for an application, while other forms typically serve as dialog boxes, data entry screens, and the like.

During "design" mode operation of the system, the user can change the properties of the form, including resizing the form and moving it anywhere on screen. The form itself includes standard features such as a control menu, minimize and maximize buttons, title bar, and resizeable borders. The user can change these features, as well as other "properties" of the form, by using the object inspector window 391 to edit the form during design time. Thus, properties define a component's appearance and behavior.

Components are the elements which a user employs to build his or her applications. They include all of the visible parts of an application, such as dialog boxes and buttons, as well as those which are not visible while the application is running (e.g., system timers). In the programming environment 360, components are grouped functionally on different pages of the component palette 364. Each functional group is identified by a tab member, which includes a label indicating the particular nature of the group. For example, components that represent the Microsoft Windows common dialog boxes are grouped on the "Dialogs" page of the palette. The palette can incorporate user-created custom controls, which the user installs onto the palette. Additionally, the user can install Visual Basic (VBX) controls, as well as third-party components.

The object inspector window 391 enables the user to easily customize the way a component appears and behaves in the application under development. The inspector 391 comprises an object selector field 392, a properties page 393, and an events page 394. The object selector 392 shows the name and type of the currently selected object, such as Form1, as shown. The properties page 391 lists the attributes of a component placed on a form (or the form itself) which can be customized. The events page, on the other hand, lists "event handlers" for a particular component. Event handlers are specialized procedures which may include user-provided program code.

Code editor 381 is a full-featured editor that provides access to all the code in a given application project. In addition to its basic editing functionality, the code editor 381 provides color syntax highlighting, for assisting the user with entering syntactically-correct code. When a project is first opened, the system automatically generates a page in the code editor for a default unit of source code; in the Object Pascal preferred embodiment, the default unit is named Unit1.

D. Delegation visually

Figure 4A:
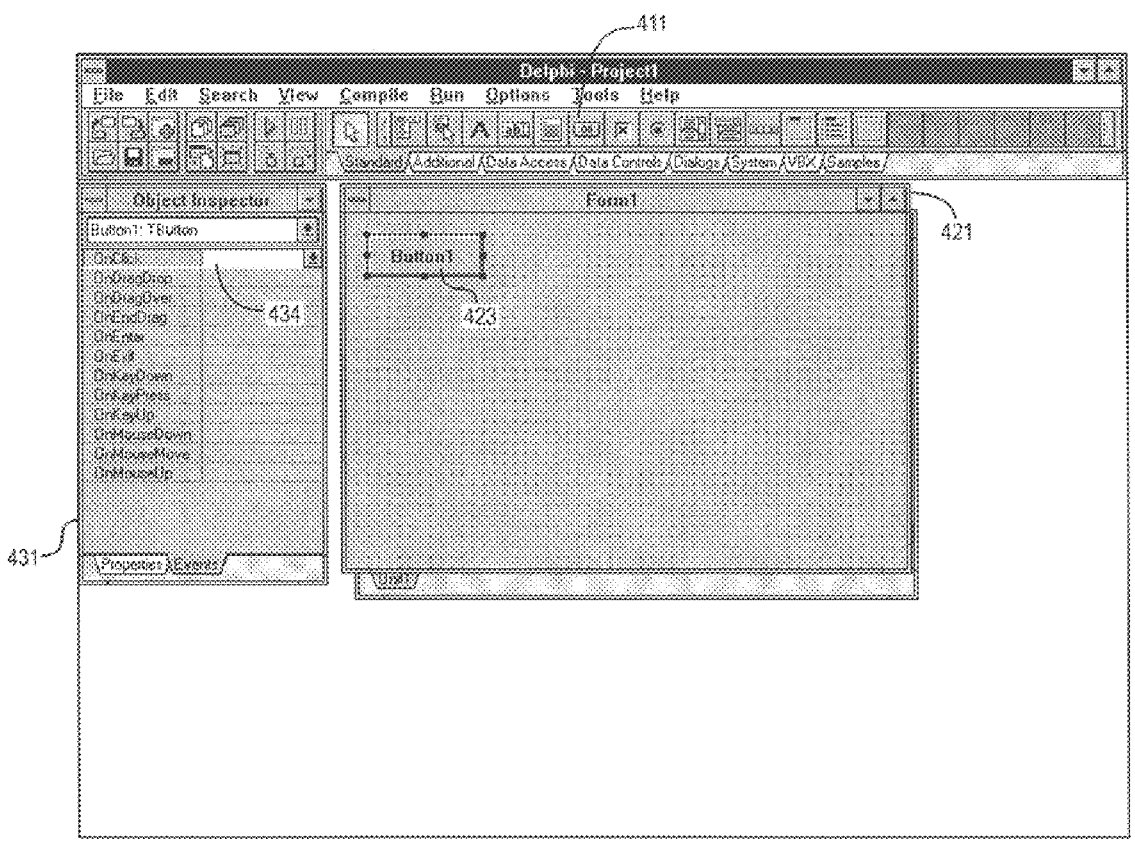
FIGS. 4A–G are bitmap screenshots illustrating use of the system for delegating control of one object to another visually (i.e., within the visual environment).
Figure 4B:
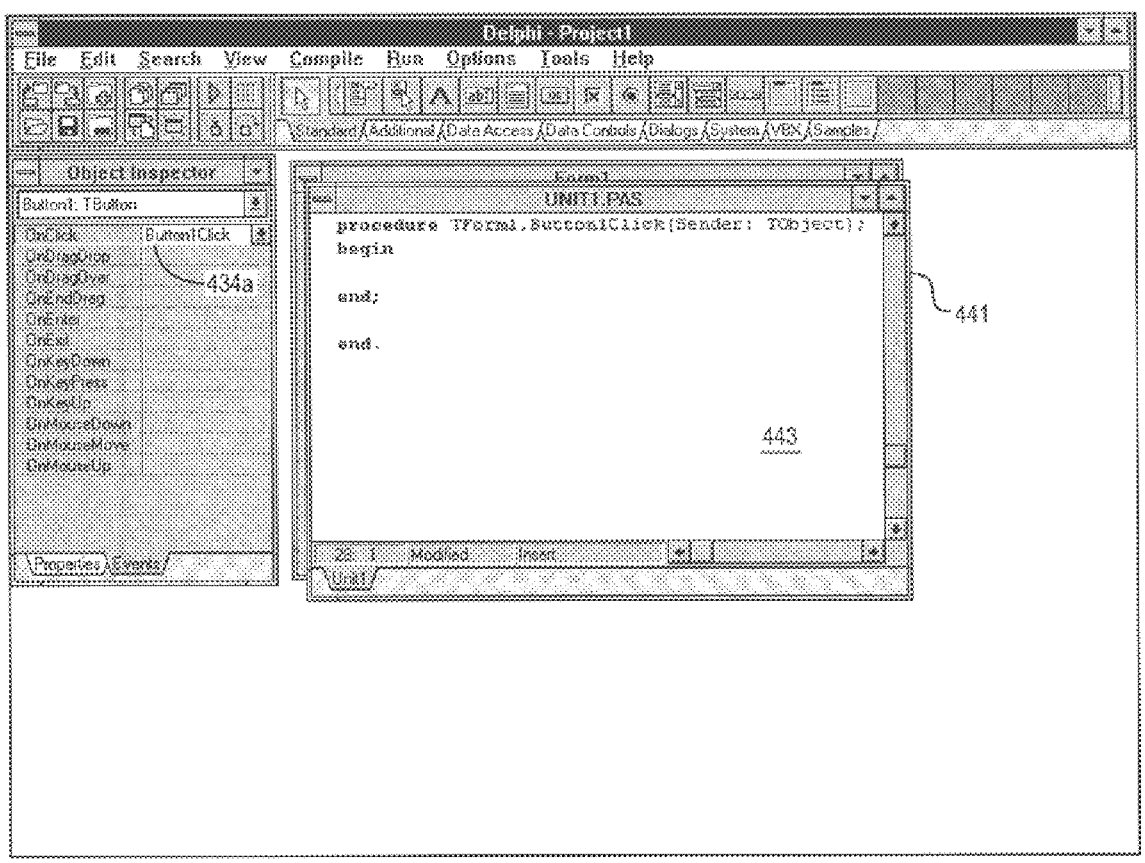

FIG. 4A illustrates a form 421 on which the user has placed a button 423 ("Button1"). This has been created by the user selecting the button component 411 and then selecting (e.g., clicking) a desired location on the form 421. Since the button 423 is the currently selected object, it is shown in the object inspector 431. By the user selecting (e.g., clicking) on the "OnClick" field 434, the system inserts an empty event handler, Button1Click, as shown in FIG. 4B. As shown at 441 in FIG. 4B, the system brings to the forefront the code editor, shown at 441. The code editor automatically displays the event handler Button1Click, at 443, for OnClick. Also, the OnClick field 434 is now updated (shown as 434*a*) to show the event handler—Button1Click—which is to receive control.

Figure 4C:
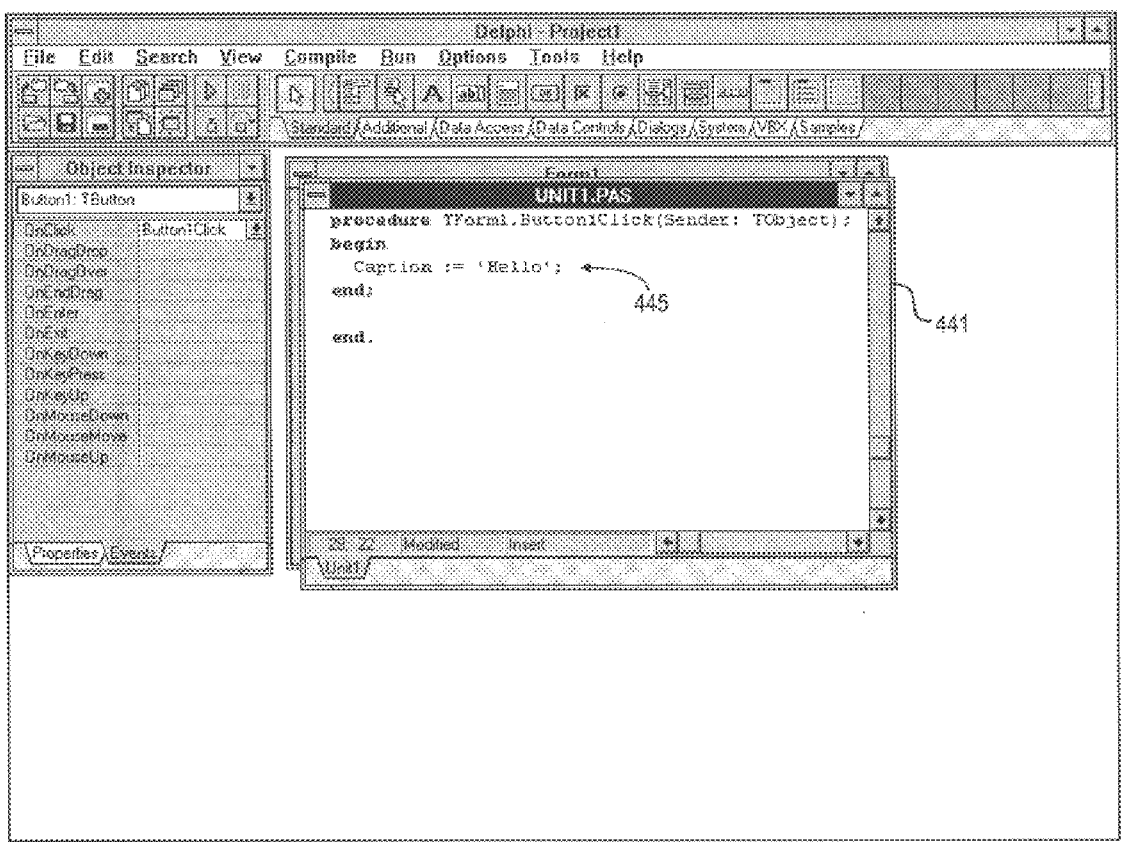

The user can now proceed to edit the event handler for supplying user-specified program code. As shown in FIG. 4C, for instance, the user has entered, at 445, the following statement:

Caption:='Hello';

Now, the event handler specifies that the Caption (Title) for the form is set to the text "Hello," upon a click event occurring at Button1.

Figure 4D:
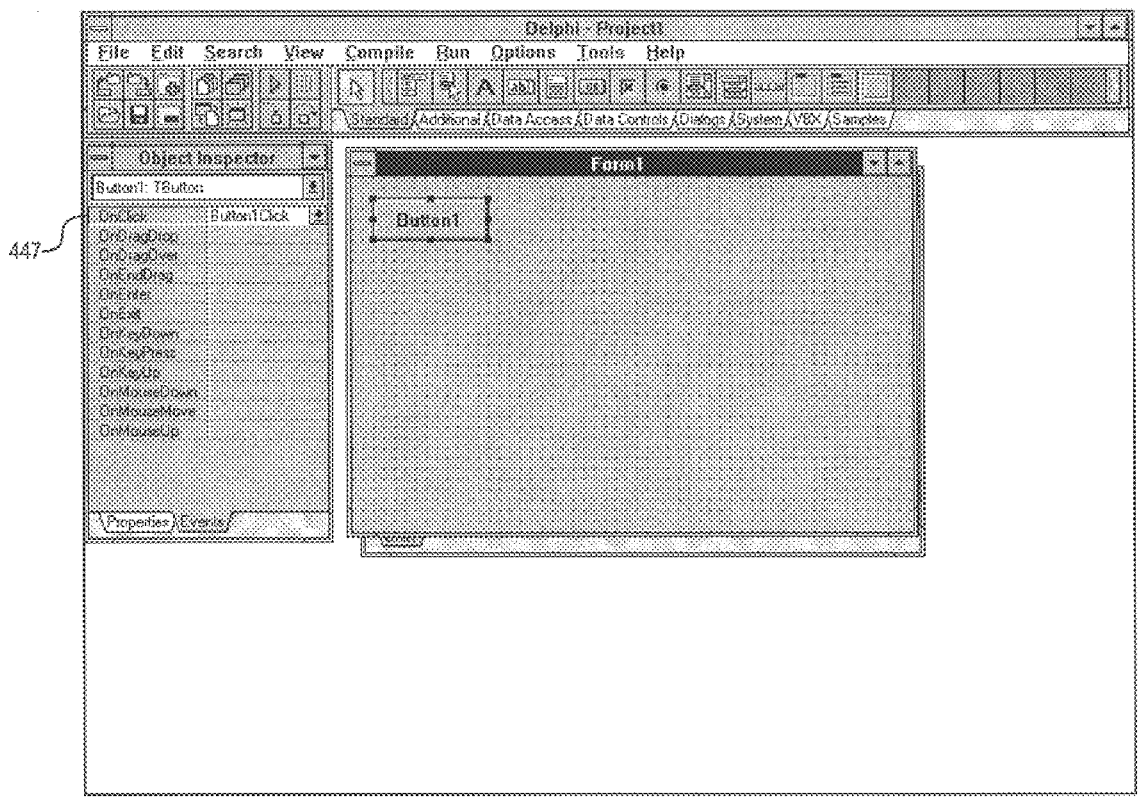
Figure 4E:
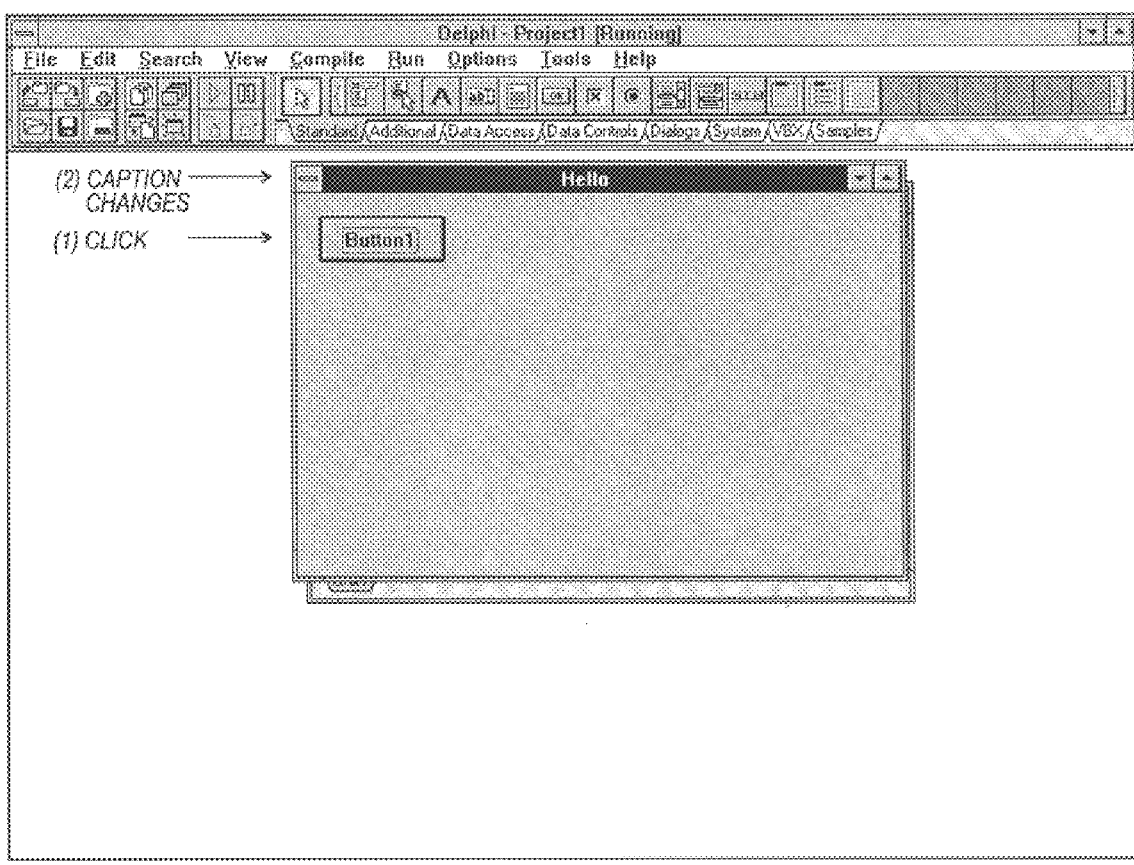

FIG. 4D illustrates the program under development after switching back from the code editor (view) to the form (view). Since Button1 remains the currently selected object, its properties and events continue to be listed by the object inspector window. Moreover, the connection between the Button1 click event handler and the OnClick event continues to be shown. Specifically, the user has visually bound Button1's "OnClick" to the event handler Form1.Button1Click FIG. 4E illustrates operation of this simple program. Programs under development are, for the convenience of the programmer, run from within the development environment; if desired, the programmer can also run the program as a standalone application. Either way, the program when running changes its caption to "Hello" upon the user clicking on the Button1 button, as shown.

Figure 4F:
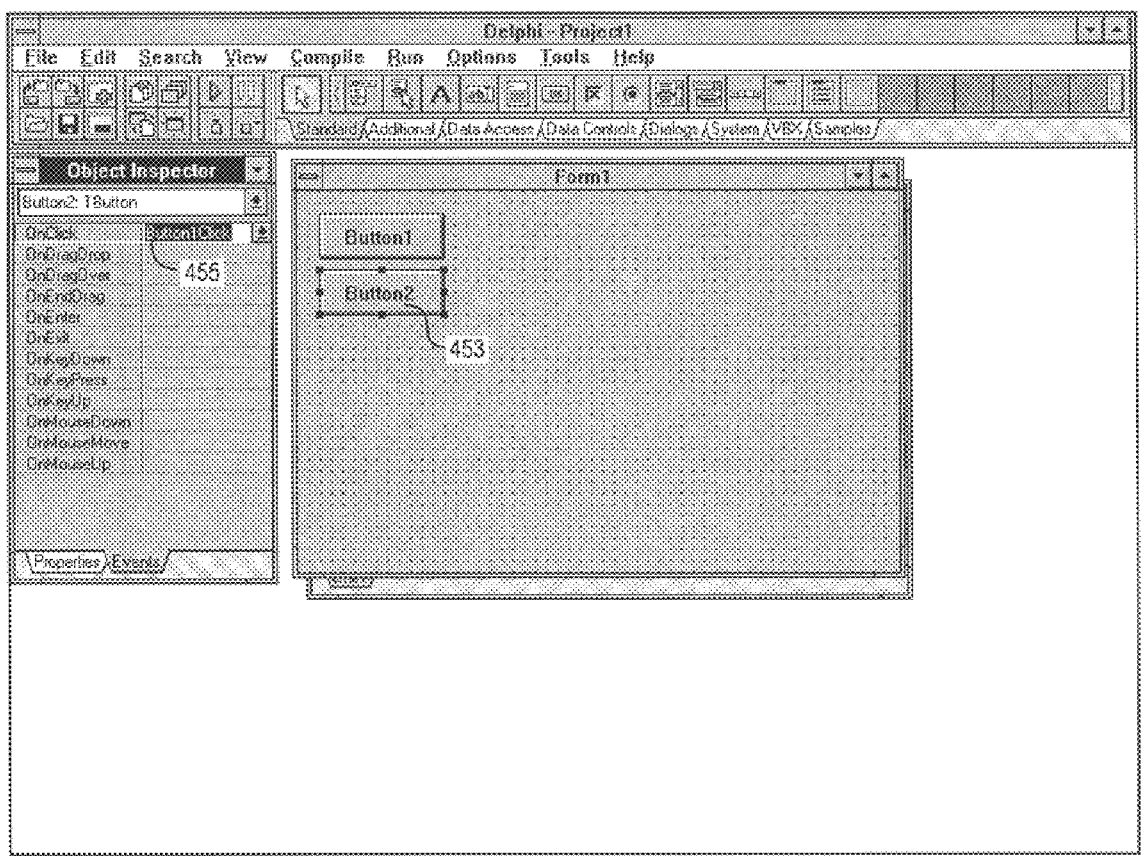
Figure 4G:
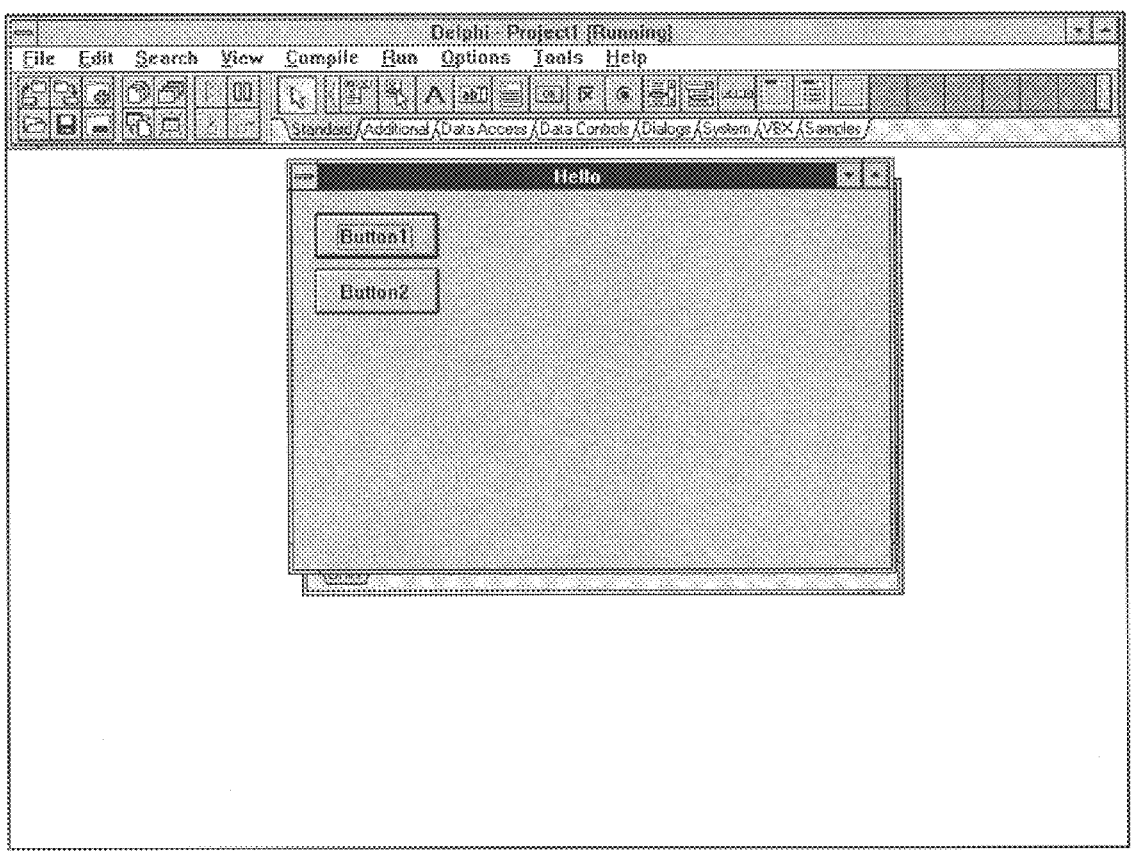

Continuing with the present example, the user can now drop down another button and bind it to the same handler (i.e., delegate control to the same handler). As shown in FIG. 4F, the user has placed Button2, at position 453. The object inspector window lists the properties and events for Button2, since it is now the currently selected button. At the OnClick field 455, the user can assign the same event handler— Button1Click—for Button2's OnClick. This selection can be made by simply invoking the pulldown list, which lists available event handlers. Upon running the application program at this point, a click at either button will change the caption of the form to "Hello." Internally, the method pointer for Button1Click is assigned to OnClick. Appearance of the form is shown in FIG. 4G, where a click at either button changes the caption of the form to "Hello."

E. Delegation programmatically

In addition to achieving delegation through the visual environment, the user can easily achieve delegation through programming as will now be illustrated. Continuing with the prior example, the buttons are "blanked out"—that is, their event handlers are removed. At this point, if the form were run and the buttons clicked, nothing would happen.

Figure 5A:
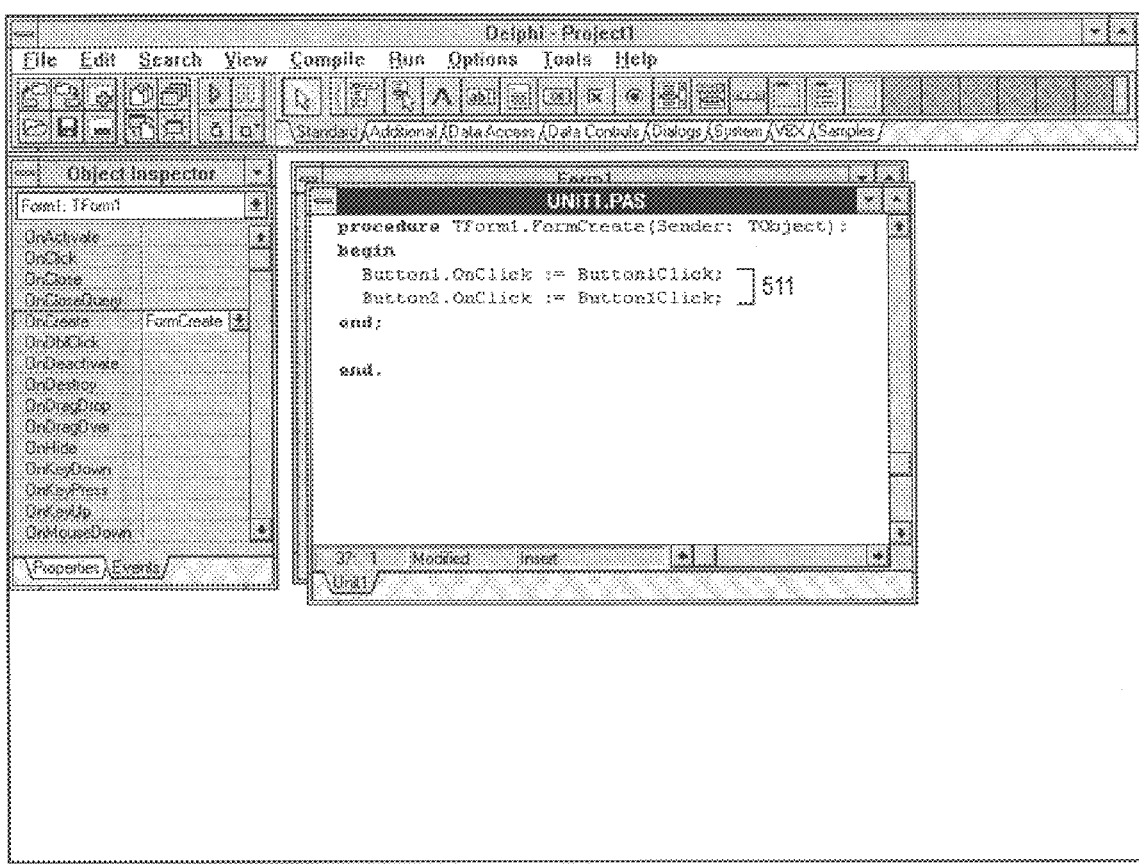
FIGS. 5A–B are bitmap screenshots illustrating use of the system for delegating control of one object to another programmatically (i.e., within the source code).
Figure 5B:
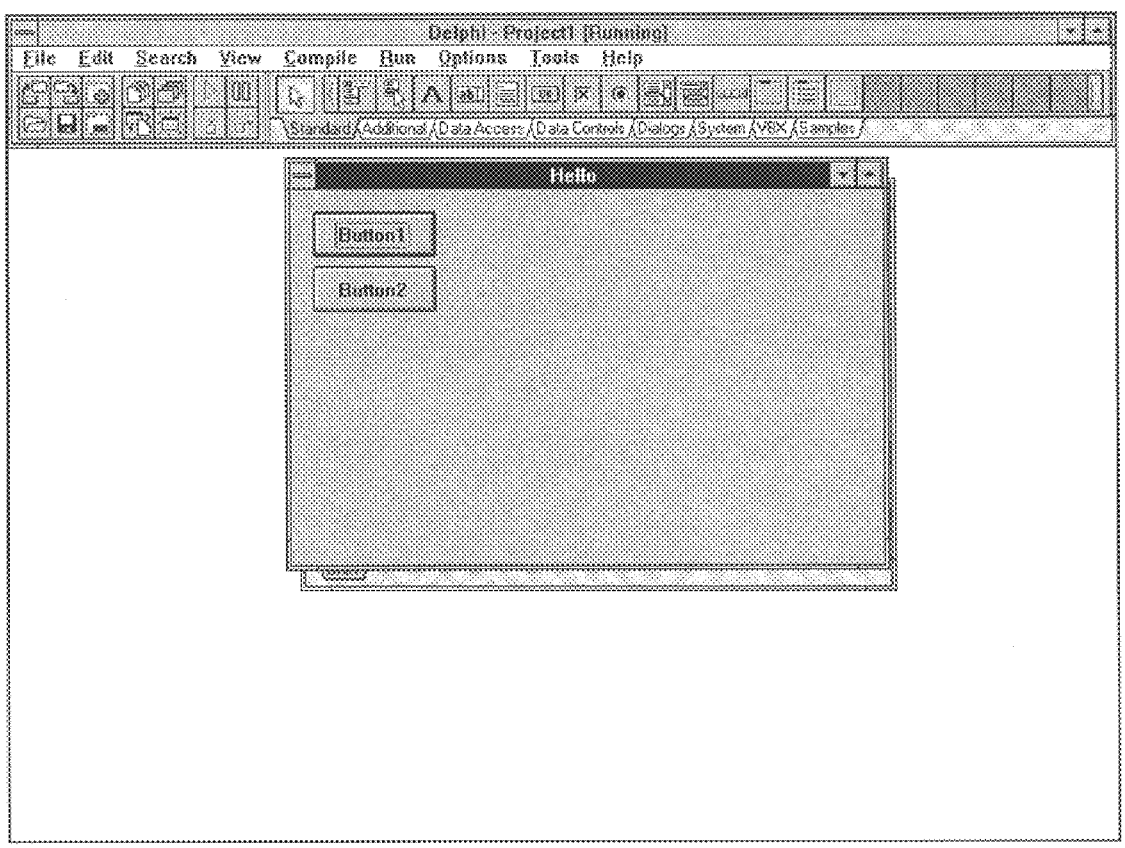

Now, the user will proceed to achieve delegation of each button programmatically. As shown in FIG. 5A, the user invokes the code editor and enters two assignment statements, at 511. The first assignment statement assigns the Button1Click method to Button1's OnClick (method pointer). Similarly, the Button1Click method is also assigned to Button2's OnClick (method pointer). When the form is run, the result is the same. As shown in FIG. 5B, when either button is clicked at runtime, the caption for the form changes to "Hello." The form in FIG. 5B operates identically as the form in FIG. 4G. Thus as just demonstrated, delegation can be easily accomplished either using the visual environment or programmatically (i.e., the user entering program code).

F. Dynamic assignment of event handlers

Figure 6A:
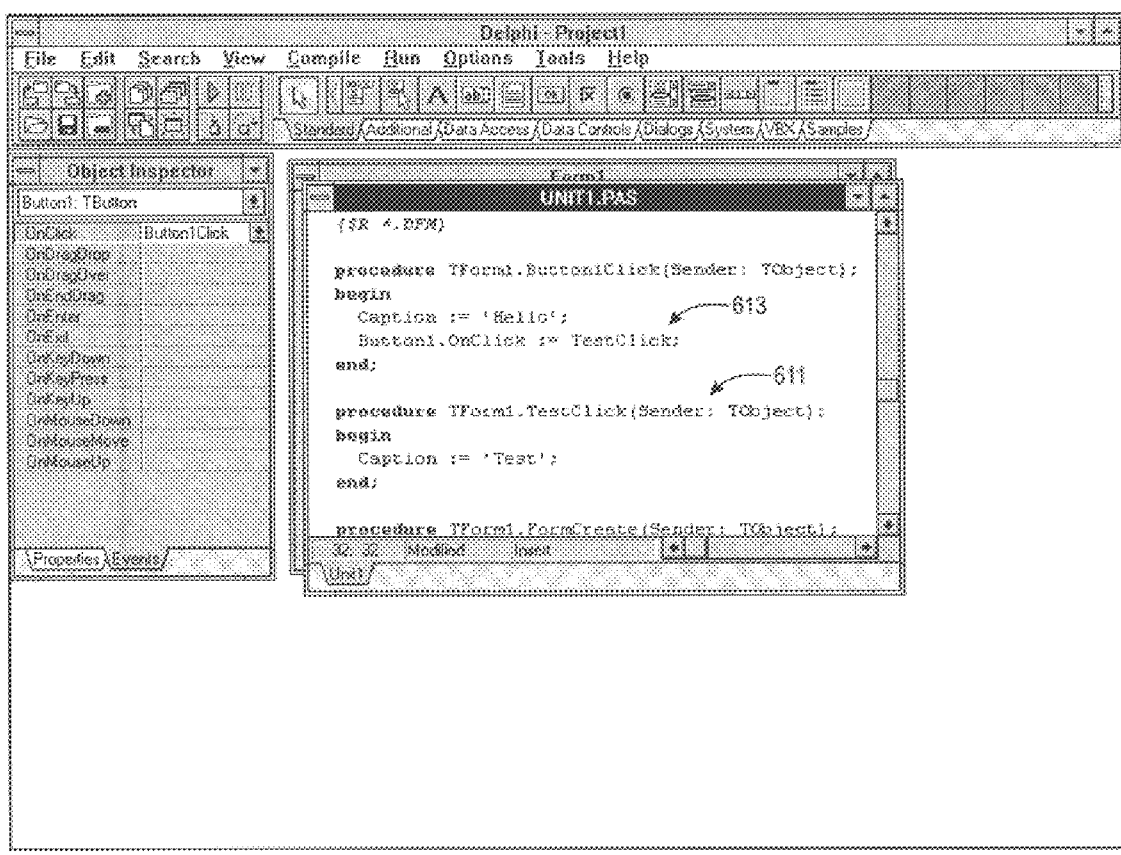
FIGS. 6A–C are bitmap screenshots illustrating use of the system for delegating control of one object to another programmatically at runtime.

Since delegation of an event handler can be done programmatically, assignment of a particular event handler can be altered dynamically at runtime, as will now be illustrated. Consider an example where clicking one button will change what clicking another button means. In FIG. 6A, the user creates a new event handler, TestClick, shown at 611. This event handler simply sets the caption equal to "Test." Further, the Button1Click event handler is modified by the user to dynamically change the event handler for Button1's OnClick to the TestClick handler, as shown at 613.

Figure 6B:
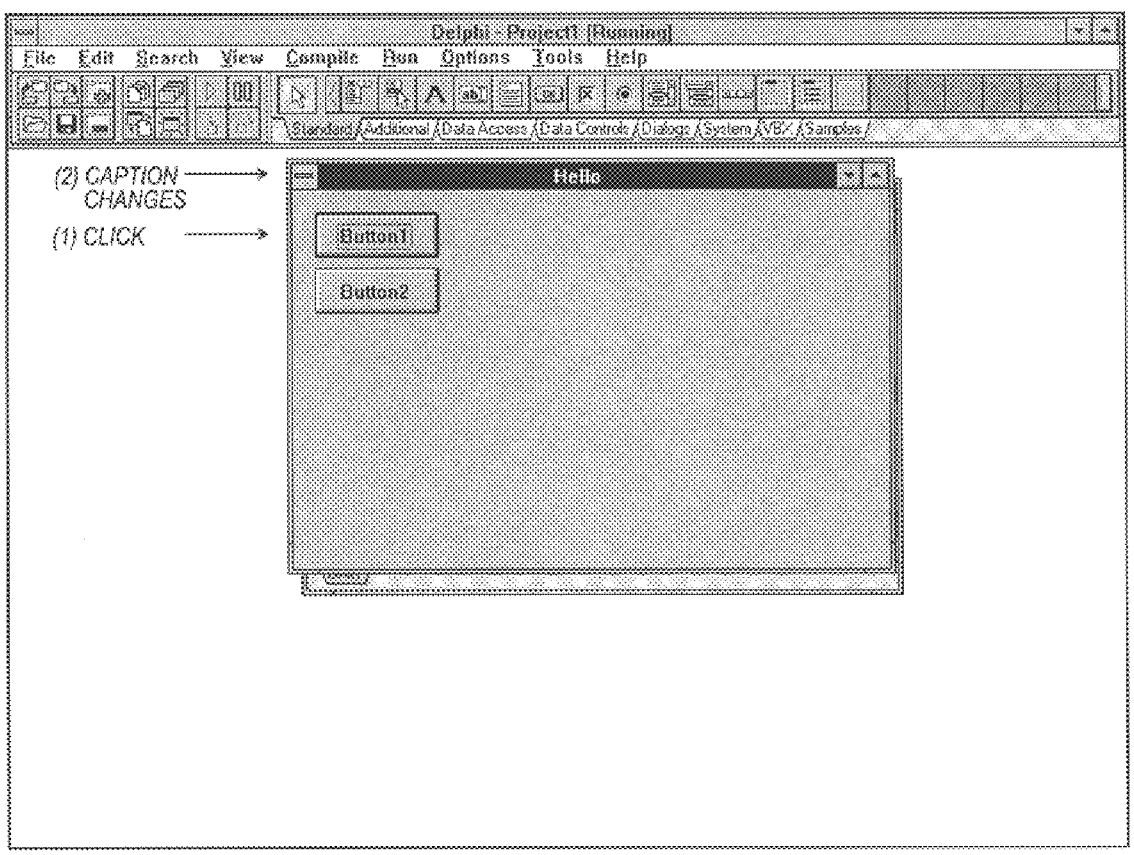
Figure 6C:
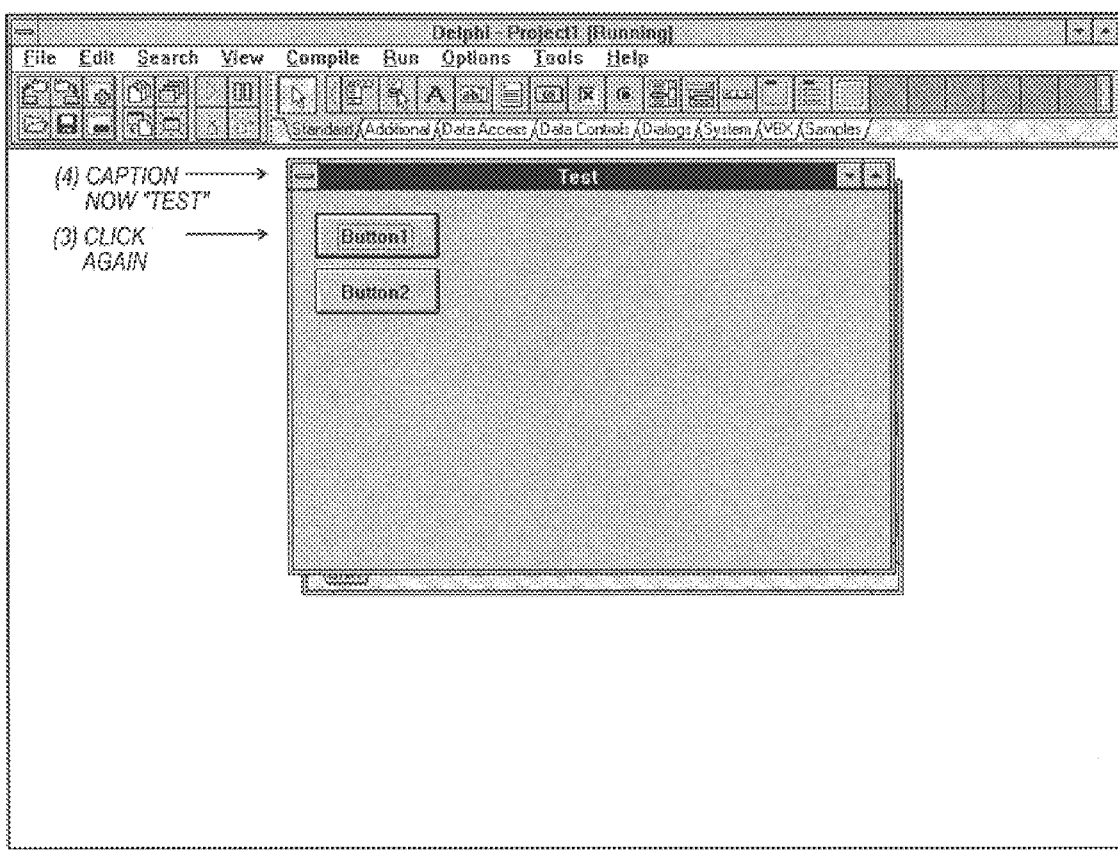

FIG. 6B–C illustrate runtime operation of the user program. Specifically, in FIG. 6B, the user clicks on Button1, whereupon the caption changes to "Hello." Also at this point, Button1's event handler has been changed to the TestClick handler (as required by the statement previously shown at 613).

In FIG. 6C, the user clicks Button1again. Now, the Caption for the form changes to "Test." Specifically, the event handler for Button1is now the TestClick event handler (previously shown at 611, in FIG. 6A). This example illustrates the feature of the present invention which allows one to dynamically change—at runtime—where control goes (i.e., to which event handler). In the system of the present invention, therefore, it is easy to assign method pointers and, thus, easy to assign a particular event handler to an object, at will. Wherever the assignment is made to, control will follow.

Figure 7:
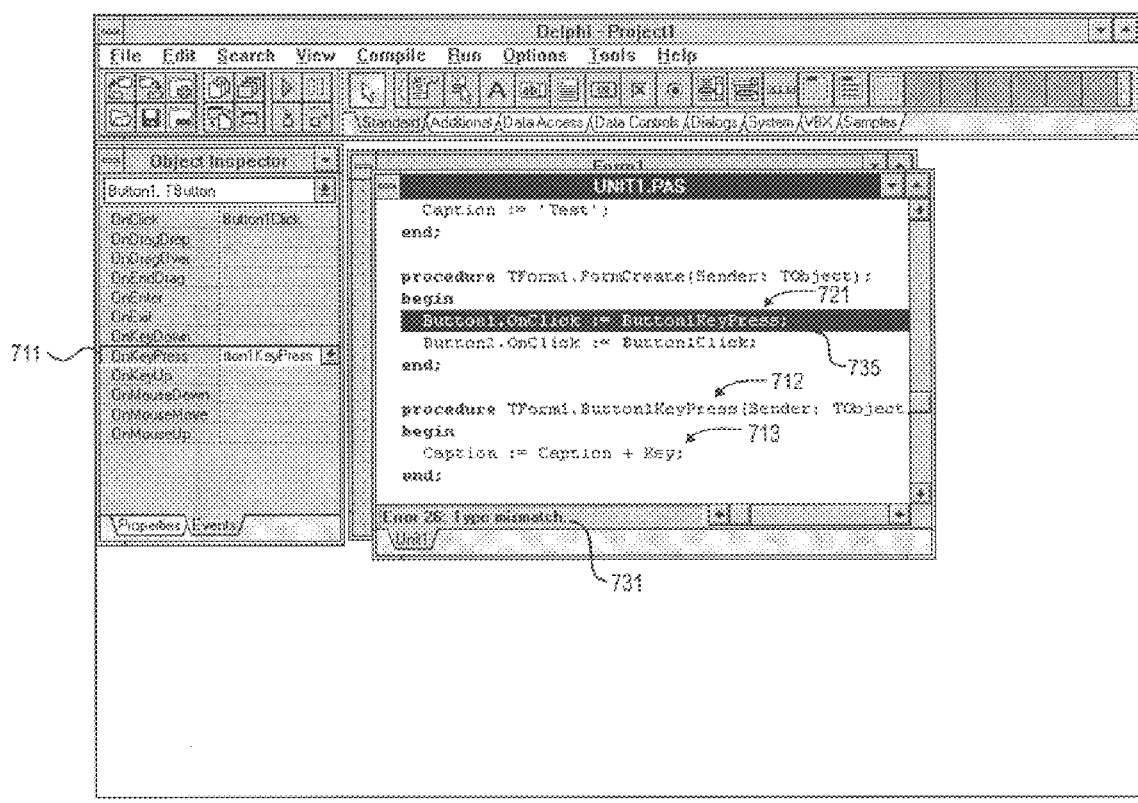
FIG. 7 is a bitmap screenshot illustrating type-checking performed by the system, for delegation.

Although the assignment of event handlers is quite simple for users, the system of the present invention only permits type-safe assignment, that is, assignments which are type compatible. This is illustrated in FIG. 7. First, the user creates an event handler, Button1KeyPress, for Button1's OnKeyPress, as shown at 711. In response, the system automatically places the event handler (skeleton) code at 712. Here, the user adds statement 713, which specifies that the Caption is changed to the Caption plus the value of the pressed key (i.e., add the character of the pressed key to the Caption). In addition to the "Sender" parameter, this event handler also takes a "Key" parameter, which specifies the key which was pressed. Therefore, when an attempt is made to assign this event handler to the OnClick method of Button1, shown at 721, a type mismatch occurs. When the user attempts to compile/run this program, the system displays a "Type mismatch" error message 731 and a highlight bar 735, highlighting the offending line. Here, the error is the incompatibility between the two handlers. This results because the Button1KeyPress handler sends "Sender" and "Key" parameters. The Button1KeyPress handler, on the other hand, expects only the "Sender" parameter.

Figure 8:
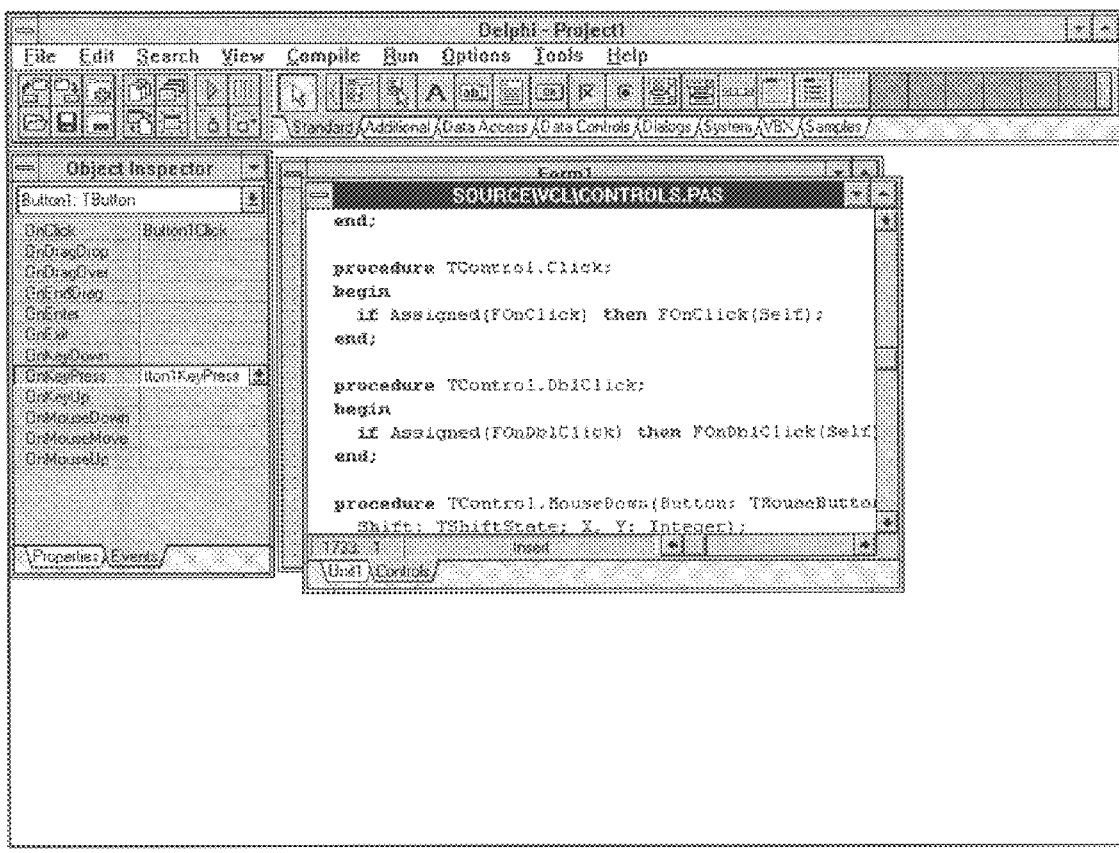
FIG. 8 is a bitmap screenshot illustrating the nature of a "Sender."

FIG. 8 illustrates the nature of "Sender." In a preferred embodiment, events, by convention, pass on "self" (i.e., "this")—that is, information specifying who the object is which is sending the event. TControl is a base class from which button objects and other user interface objects inherit. Since a "Click" event (and method thereof) is common for most user interface objects, this base class (i.e., "TControl") includes a handler for a click event. As shown, the handler itself first checks whether an event handler has been assigned for the object (i.e., a method pointer assigned). If so, the handler is invoked with the self (i.e., sender) information as a parameter.

Internal operation

A. Direct language support

Recall that when one normally calls a "function" in a conventional programming environment, the function is called directly. When one employs a function pointer, on the other hand, the function is called indirectly through the pointer to (address of) the function. In accordance with the present invention, instead of having a function pointer point to a function, a method pointer is employed which points to a method of an object—that is, a method of a particular instance of an object.

With a conventional function pointer, only one piece of information is carried—the address of the function. No contextual information is carried. With the method pointer of the present invention, in contrast, the method is invoked on a particular object instance, including the data for that particular object instance. In this manner, the method can be invoked with the context of the object. Stated generally, therefore, the present invention provides a language construct that allows a programmer to represent the notion of a method which can be evaluated and held onto for invoking later.

Further, in accordance with the present invention, a preferred syntax for declaring a method pointer in a type-safe fashion is provided. As shown by the declarations which follow below, a method pointer, when declared, is just declared as a data member of type "method pointer." This is the data type which stores a pointer to a method of a particular object. The method pointer can be set to any object type, provided that, in a preferred embodiment, it is signature compatible: the parameter list and function return value are compatible.

Consider the following declarations.

```
1:   { Declaring a method pointer }
2:
3:   type
4:       TMethod = procedure of object;
5:       TStringMethod = procedure(S: string) of object;
6:       TCoordMethod = procedure(X, Y: Integer) of object;
7:       TFuncMethod = function(X: Double): Double of object;
```

The above code snippet represents the declaration of four types of method pointers:

TMethod, TStringMethod, TCoordMethod, and TFuncMethod. The TMethod type of method pointer, declared at line 4, simply declares a type of method pointer which takes no parameters (i.e., "void" parameters). In the system of the present invention, method pointers can be used for "procedures" (i.e., return no value) or "functions" (i.e., return a value). The language construct "of object" distinguishes the item to be a method pointer. If "of object" is omitted, the declaration would simply be one of a function pointer.

The remaining method pointer types, from line 5 to line 7, set forth method pointer types of methods which do take parameters. The TStringMethod type, at line 5, takes a string parameter, for instance. The TFuncMethod, at line 7, takes a double (floating point) parameter. Moreover, this method pointer is declared to be a "function" and, thus, can return a value (here, a "double" value).

Consider the declaration of a class which includes class methods, as follows.

```
1:   { Declaring a method pointer }
2:
3:   type
4:       TMethod = procedure of object;
5:       TStringMethod = procedure(S: string) of object;
6:       TCoordMethod = procedure(X, Y: Integer) of object;
7:       TFuncMethod = function(X: Double): Double of object;
8:
9:   { Declare a class of type TFooObject }
10:  type
11:      TFooObject = class
12:      private
13:          . . .
14:      public
15:          procedure DoSomething;
16:          procedure Print(S: string);
17:          procedure MoveTo(X, Y: Integer);
18:          function Transform(X: Double): Double;
19:      end;
20:
21:  { Declare a class of type TBarObject }
22:  type
23:      TBarObject = class
24:      private
25:          . . .
26:      public
27:          procedure Hello;
28:      end;
```

```
29:
30:  { Declare variables }
31:  var
32:      MyMethod: TMethod;
33:      StringMethod: TStringMethod;
34:      CoordMethod: TCoordMethod;
35:      FuncMethod: TFuncMethod;
36:      FooObject: TFooObject;
37:      BarObject: TBarObject;
38:      X: Double;
39:
40:  { Start of body of program (steps) }
41:  begin
42:      FooObject := TFooObject.Create;
43:      BarObject := TBarObject.Create;
44:
45:
46:
47:      { . . . }
48:
49:
50:
51:  { Assign compatible method to method pointer }
52:
53:      MyMethod := FooObject.DoSomething;
54:
55:  { This will call FooObject.DoSomething }
56:
57:      MyMethod;
58:
59:  { Assign compatible method to method pointer }
60:
61:      MyMethod := BarObject.Hello;
62:
63:  { This will call BarObject.Hello }
64:
65:      MyMethod;
66:
67:  { Again, StringMethod and FooObject.Print are type compatible }
68:
69:      StringMethod := FooObject.Print;
70:
71:      StringMethod('Hello world');
72:
73:      FuncMethod := FooObject.Transform;
74:
75:      X := FuncMethod(1234.5678);
76:
77:  end;
```

The declaration declares, in Delphi Object Pascal syntax, a class of type TFooObject. Starting at line 5, the class defines certain public methods. Per conventional object-oriented programming methodology, implementation of these methods would be defined elsewhere in the code (i.e., outside of the class definition). In a similar manner, at lines 21–28, a TBarObject class is defined, which includes a "Hello" method (at line 27).

At lines 30–38, various variables are declared. These declarations include object declarations, such as the declaration of the FooObject at line 36 (of class TFooObject) and the BarObject at line 37 (of class TBarObject). The program body proper (i.e., where programming steps are set forth) starts after line 40. After initialization steps (lines 42–43), the MyMethod method pointer is assigned to the DoSomething method of FooObject, at line 53. Note particularly, at this point, that the method pointer (MyMethod) is type compatible with the method (DoSomething). Each takes no parameters and returns no value. In order to invoke the actual method, one need only enter the following statement, as shown at line 57:

MyMethod;

This call ends up calling FooObject.DoSomething.

Further, the MyMethod method pointer can now be assigned the Hello method of BarObject, as shown at line 61. The Hello method is called indirectly at line 65, as follows:

MyMethod;

In a manner similar to that shown at line 57, this call will call into BarObject.Hello. Other examples of type-compatible assignments with method calls are illustrated at lines 67–75.

B. Compiler-generated machine instructions

Highly-efficient machine instructions generated for assignments, from the above examples, will now be illustrated. In an exemplary embodiment, generated machine code is as follows for the assignment of FooObject.DoSomething into MyMethod.

```
1:    { Assignment }
2:        MyMethod := FooObject.DoSomething;
3:            MOV   DWORD PTR MyMethod[0],
                  OFFSET TFooObject.DoSomething
4:            MOV   EAX,FooObject
5:            MOV   DWORD PTR MyMethod[4],EAX
```

As shown at line 3, the first double word (32 bits DWORD) of a method pointer is the address of the method (i.e., the function pointer portion). Therefore, at line 3, the address (offset) of the DoSomething method is moved into this DWORD of the method pointer. At line 4, the context of the FooObject variable is stored by loading the "this" pointer into a register (here, the Intel-compatible EAX register). At line 5, this context (stored in the EAX register) is now copied into the second DWORD of MyMethod. (Note the two-step memory transfer (via a register) is a requirement of the Intel platform, not the present invention.)

A call through this method pointer is accomplished as follows.

```
1:    { Call through method pointer }
2:        MyMethod;
3:            MOV    EAX,DWORD PTR MyMethod[4]
4:            CALL   DWORD PTR MyMethod[0]
```

Using register calling convention, the call proceeds as follows. At line 3, the context of MyMethod (i.e., the "this" pointer stored by the second DWORD) is loaded into the EAX register. Then, at line 4, the system simply calls through the function pointer (DWORD) stored by the first DWORD of MyMethod. As shown, the "this" pointer is loaded from the second DWORD into the first register, EAX, then the call is made through the address (function pointer) stored by the first DWORD.

Now consider a method having two parameters, the CoordMethod. The CoordMethod is assigned to the FooObject.MoveTo method, generating the following machine instructions.

```
1:    { Assignment }
2:        CoordMethod := FooObject.MoveTo;
3:            MOV   DWORD PTR CoordMethod[0],
                  OFFSET TFooObject.MoveTo
4:            MOV   EAX,FooObject
5:            MOV   DWORD PTR CoordMethod[4],EAX
6:
7:    { Call through method pointer }
8:        CoordMethod(10, 20);
```

```
                    -continued
9:            MOV   EAX,DWORD PTR CoordMethod[4]
10:           MOV   EDX,10
11:           MOV   ECX,20
12:           CALL  DWORD PTR CoordMethod[0]
```

At line 3, the offset of the MoveTo method is copied into the first DWORD of the CoordMethod method pointer, in a manner to that previously described. At line 4, the context ("this" pointer) of FooObject is moved into the EAX register for copying into the second DWORD of the CoordMethod method pointer.

Line 8 illustrates an actual call through CoordMethod, passing two parameters: 10 and 20. The "this" pointer is moved into the EAX register, as shown at line 9. Next, each parameter is moved into a register (as this example employs register calling convention). Specifically, the value of 10 is moved into the EDX register, at line 10. The value of 20 is moved into the ECX register, at line 11. Finally, at line 12, a call through the first DWORD (pointer) stored by the CoordMethod method pointer is generated.

The method pointer approach of the present invention is exceptionally efficient in the generation of machine code instructions for calls through method pointers, as shown above. This efficiency will be highlighted by contrasting a method pointer call with a call made through a conventional function pointer. Consider a direct call to the method FooObject.MoveTo. The machine code generated for this direct method call is as follows.

```
1:    { Direct method call }
2:        FooObject.MoveTo(10, 20);
3:            MOV    EAX,FooObject
4:            MOV    EDX,10
5:            MOV    ECX,20
6:            CALL   TFooObject.MoveTo
```

Recall that a call through a method pointer comprises fetching the "this" pointer (stored by the second DWORD) and calling through the pointer-to-method (i.e., function pointer stored by the first DWORD of the method pointer). For a direct method call, the system fetches the "this" pointer (line 3 above), followed by calling the address of the method (line 6). Any relevant parameters are loaded into registers (or pushed on to the stack, if register calling convention is not used), as shown at lines 4–5. Note particularly that the direct method call yields the same number of machine instructions as are generated for a call through a method pointer of the present invention. The same holds true when passing parameters, as shown for the MoveTo example above.

C. Virtual method support

With a conventional virtual method, a direct method call is made by loading the EAX register with the "this" pointer, loading the dispatch or virtual table (VTable), and then calling through a slot (i.e., function pointer) in the VTable. For a direct call through a conventional virtual method, therefore, one more level of indirection is encountered than incurred with a function pointer call. With a method pointer of the present invention, however, the "virtualness" (i.e., additional indirection) of a virtual method is incurred only once—at the time of assignment. All calls thereafter are static and are, thus, even more efficient than corresponding direct virtual method calls.

This is illustrated for the DoSomething method which is declared as virtual, as follows.

```
1:   type
2:       TMethod = procedure of object;
3:
4:   type
5:       TFooObject = class
6:       private
7:           . . .
8:       public
9:           procedure DoSomething; virtual;
10:      end;
11:
12:  var
13:      Method: TMethod;
14:      FooObject: TFooObject;
15:
16:  { Assignment }
17:      Method := FooObject.DoSomething;
18:          MOV     EAX,FooObject
19:          MOV     EDX, [EAX]           { Get virtual table
                                            pointer }
20:          MOV     EDX, [EAX+xxxx]      { xxxx = virtual
                                            table offset }
21:          MOV     DWORD PTR Method[0],EDX
22:          MOV     DWORD PTR Method[4],EAX
23:
24:  { Call through method pointer -- DOESN'T CHANGE }
25:      Method;
26:          MOV     EAX,DWORD PTR Method[4]
27:          CALL    DWORD PTR Method[0]
28:
29:  { Direct method call }
30:      FooObject.DoSomething;
31:          MOV     EAX,FooObject
32:          MOV     EDX, [EAX]
33:          CALL    DWORD PTR [EAX+xxxx]
```

Note in particular that since the address to the virtual method can be resolved at the time of the assignment (particularly, lines 19–21), the call of a virtual method through a method pointer of the present invention can be performed simply by loading the "this" pointer from the second DWORD (line 26) and calling through the address of the now-resolved virtual method (stored in the first DWORD of the method pointer), as shown at line 27. The machine instructions generated for a direct method call are shown at lines 31–33. If a virtual function is to be called more than one time, it is actually even more efficient to assign it into a method pointer, so that its (virtual) address is resolved only once. Calls thereafter (through the method pointer) result in less machine code and are, hence, more efficient.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In an object-oriented development system for creating a computer program, said computer program comprising objects which respond to events, a method for delegating control for handling an event from a first object to a method of a second object, the method comprising:

creating a method pointer at the first object, said method pointer for storing an address of a particular method of another object together with an address for the other object, said address for the object serving as a "this" pointer through which local data of the object can be accessed;

receiving user input for delegating control for handling said event from said first object to a particular method of said second object;

in response to said user input, storing in said method pointer of said first object an address for said particular method of said second object together with said "this" pointer for said second object; and upon occurrence of said event at said first object during execution of said computer program, invoking said particular method of said second object through said method pointer, said particular method accessing local data of said second object through a "this" pointer comprising the address of said second object which is stored by said method pointer.

2. The method of claim 1, wherein said objects which comprise said computer program include button objects.

3. The method of claim 1, wherein said first object is a button object and wherein said event is a button "click" event.

4. The method of claim 1, wherein said creating step comprises:

providing said object-oriented development system with a language syntax for programmatically creating method pointers in source code format.

5. The method of claim 4, wherein each method pointer declared in source code format is declared in a form comprising a name of the method pointer followed by a type for the method pointer.

6. The method of claim 5, wherein each method pointer for a method taking no parameters and returning no value is declared in a format comprising:

name of method pointer equals procedure of object.

7. The method of claim 5, wherein each method pointer for a method which takes parameters and returns no value is declared in a format comprising:

name of the method pointer equals procedure, with parameter list, of object.

8. The method of claim 5, wherein each method pointer for a method returning a value but taking no parameters is declared in a format comprising:

name of method equals return value type followed by function of object.

9. The method of claim 5, wherein each method pointer for a method returning a value but taking no parameters is declared in a format comprising:

name of method equals return value type followed by function, with parameter list, of object.

10. The method of claim 1, wherein said method pointer comprises two 32-bit double words, one double word storing the address of said particular method as a 32-bit function pointer, the other double word storing the address of said second object as a 32-bit "this" pointer.

11. The method of claim 1, wherein said user input comprises:

a programming construct set forth in source code.

12. The method of claim 11, wherein said programming construct comprises an assignment expression.

13. The method of claim 12, wherein said assignment expression takes a form comprising a name of the method pointer, followed by an equal sign, followed by a name of said particular method.

14. The method of claim 13, wherein said assignment expression takes a form comprising:

name of method pointer equals name of object followed by dot operator followed by name of method.

15. The method of claim 14, wherein the name of the object is implied if said assignment expression occurs within another method of said object.

16. The method of claim 1, wherein said user input comprises:

user input received at a graphical user interface, for assigning said particular method in said second object to handle the event which occurs at said first object.

17. The method of claim 16, wherein said graphical user interface includes a property manager dialog listing properties for each object, said properties including event handlers which are assigned for handling events which occur at each object.

18. The method of claim 17, wherein said user input comprises selecting said particular method of said second object from a pull down list of methods.

19. The method of claim 1, wherein said storing step further comprises:

first checking whether said method of said second object is type compatible for receiving information about said event.

20. The method of claim 1, wherein said second object is type compatible if it takes parameters which are the same type as information provided by said system about said event.

21. In a computer system, a method for binding first and second objects together, the method comprising:

storing in the first object a method pointer for delegating handling of events occurring at the first object to a particular method of the second object, said method pointer comprising:
(i) first information stored in the first object providing access to the particular method of the second object, which is to handle a particular type of event which occurs at the first object;
(ii) second information stored at the first object serving as a "this" points providing access to local data members of the second object, so that said particular method of the second object can be invoked within a particular context of said second object; and upon occurrence of the event at said first object, using said first stored information for invoking said particular method of said second object, the particular method using said second stored information to access the local data members of the second object.

22. The method of claim 21, wherein said first information comprises a function pointer storing an address for said particular method in memory.

23. The method of claim 21, wherein said second information comprises a "this" pointer storing an address for said second object, said local data members residing in memory at a known offset from the address stored by said "this" pointer.

24. The method of claim 21, wherein said local data members comprise data defining properties for said second object.

25. The method of claim 21, wherein each of said first and second objects comprises object instances created from different classes of objects.

26. The method of claim 21, wherein said event is a user input event which occurs in the system.

27. The method of claim 21, wherein said storing first information comprises:

copying a double word pointer comprising a function pointer for said particular method into memory allocated for said first object.

28. The method of claim 21, wherein said storing second information comprises:

copying a double word pointer comprising a "this" pointer for said second object into memory allocated for said first object.

29. The method of claim 21, wherein said using said first information step comprises:

executing a machine instruction for calling into a memory address indicated by said first stored information, said memory address storing machine instructions for processing said particular event.

30. A visual development system comprising:

a computer having a processor and a memory;

a visual interface for positioning objects on a form displayed on screen, each object responding to events with a certain behavior; and means for changing behavior of a first object by delegating the object's responsibility for responding to a particular event to a handler of a second object, said means including means for storing in the first object a pointer storing an address for the handler of the second object together with a "this" pointer storing an address for said second object for providing a particular context of said second object, so that occurrence of the particular event at the first object results in invocation of the handler with the context of said second object.

31. The system of claim 30, wherein said means for changing behavior includes:

a property manager providing a list of handlers suitable for handling said particular event.

32. The system of claim 31, wherein handlers which are suitable for handling said particular event take parameters compatible with information provided by the system upon occurrence of the particular event.

33. The system of claim 32, wherein said information provided by the system includes a description of which object the event occurred at.

34. The system of claim 30, wherein said information describing a particular context of the second object includes a "this" pointer allowing access to local data stored by the second object.

35. The system of claim 30, wherein said first object is a button object displayed on screen, and wherein said second object is a form object displayed on screen.

* * * * *